(12) United States Patent
Lerche et al.

(10) Patent No.: US 8,884,778 B2
(45) Date of Patent: Nov. 11, 2014

(54) APPARATUS AND METHODS FOR CONTROLLING AND COMMUNICATING WITH DOWNHOLE DEVICES

(71) Applicant: Hunting Titan, Ltd., Pampa, TX (US)

(72) Inventors: Nolan C. Lerche, Stafford, TX (US); James E. Brooks, Manvel, TX (US)

(73) Assignee: Hunting Titan, Inc., Pampa, TX (US)

( * ) Notice: Subject to any disclaimer, the term of this patent is extended or adjusted under 35 U.S.C. 154(b) by 0 days.

(21) Appl. No.: 13/869,825

(22) Filed: Apr. 24, 2013

(65) Prior Publication Data
US 2013/0300569 A1 Nov. 14, 2013

Related U.S. Application Data

(63) Continuation of application No. 12/221,611, filed on Aug. 5, 2008, which is a continuation-in-part of application No. PCT/US2008/000200, filed on Jan. 7, 2008.

(51) Int. Cl.
| | |
|---|---|
| E21B 47/09 | (2012.01) |
| E21B 43/1185 | (2006.01) |
| F42D 1/055 | (2006.01) |
| G01V 3/18 | (2006.01) |
| E21B 43/119 | (2006.01) |
| E21B 41/00 | (2006.01) |

(52) U.S. Cl.
CPC ............ *E21B 43/1185* (2013.01); *F42D 1/055* (2013.01); *G01V 3/18* (2013.01); *E21B 43/119* (2013.01); *E21B 41/0021* (2013.01)
USPC .... 340/853.2; 340/855.7; 166/66; 166/255.1; 166/255.2

(58) Field of Classification Search
CPC ....... E21B 47/024; E21B 47/12; E21B 44/00; E21B 44/005

USPC .......... 340/853.2, 854.1, 855.3, 855.5, 855.7; 166/66, 255.1, 255.2; 175/24, 45
See application file for complete search history.

(56) References Cited

U.S. PATENT DOCUMENTS

| | | | |
|---|---|---|---|
| 4,208,966 | A | 6/1980 | Hart |
| 4,986,183 | A | 1/1991 | Jacob |

(Continued)

FOREIGN PATENT DOCUMENTS

| | | |
|---|---|---|
| CA | 2708007 | 11/2013 |
| EP | 2106494 B1 | 9/2011 |

(Continued)

OTHER PUBLICATIONS

File history of PCT/US08/00200, filed Jan. 7, 2008, 99 pages.

(Continued)

*Primary Examiner* — Benjamin Fiorello
(74) *Attorney, Agent, or Firm* — Arnold, Knobloch & Saunders, L.L.P.; Jason A. Saunders

(57) ABSTRACT

Apparatus and methods for controlling and communicating with one or more tools in a downhole tool string including a tractor, an auxiliary tractor tool, a logging tool, a safety sub, a release mechanism, a unit containing sensors for monitoring downhole conditions, a setting tool, and a perforating gun. Also provided are apparatus and methods for controlling and communicating with one or more perforating guns, release devices, and explosive devices in a string to be lowered into a wellbore. Control and communication are accomplished by sending signals from the surface to control switches in the control units on the tool, with redundant switches for safety, to state machines in the respective control units, "each state machine returning a signal verifying switch status to the surface. Control and power functions are accomplished with voltage of different polarities for safety.

8 Claims, 27 Drawing Sheets

(56) References Cited

U.S. PATENT DOCUMENTS

| | | |
|---|---|---|
| 6,283,227 B1 | 9/2001 | Lerche et al. |
| 6,604,584 B2 | 8/2003 | Lerche |
| 6,938,689 B2 | 9/2005 | Farrant |
| 6,959,765 B2 | 11/2005 | Bell |
| 7,347,278 B2 | 3/2008 | Lerche et al. |
| 7,530,397 B2 | 5/2009 | Bell |
| 7,536,942 B2 | 5/2009 | Bell |
| 7,698,982 B2 | 4/2010 | Bell |
| 8,576,090 B2 | 11/2013 | Lerche et al. |
| 8,689,868 B2 | 4/2014 | Lerche et al. |
| 2002/0062991 A1 | 5/2002 | Farrant |
| 2004/0108114 A1 | 6/2004 | Lerche |
| 2005/0045331 A1 | 3/2005 | Lerche |
| 2006/0130693 A1 | 6/2006 | Teowee |

FOREIGN PATENT DOCUMENTS

| | | |
|---|---|---|
| EP | 2229503 B1 | 5/2012 |
| EP | 2402556 | 3/2013 |
| EP | 2402555 B1 | 4/2013 |
| GB | 2340157 A | 2/2000 |
| NO | 2402555 B1 | 4/2013 |
| NO | 2402556 B1 | 6/2013 |
| WO | 0024999 A1 | 5/2000 |
| WO | 2007143759 A1 | 12/2007 |
| WO | 2008100362 A2 | 8/2008 |
| WO | 2010016897 A2 | 2/2010 |

OTHER PUBLICATIONS

Notification of Transmittal of International Search Report and Written Opinion of the International Searching Authority, PCT/US08/00200, dated Feb. 2, 2009, 14 pages.
International Preliminary Report on Patentability, PCT/US08/00200, dated Jul. 7, 2009, 7 pages.
File history of PCT/US09/04477, filed Aug. 5, 2009, 135 pages.
Notification of Transmittal of International Search Report and Written Opinion of the International Searching Authority, PCT/US09/04477, dated Mar. 11, 2010, 17 pages.
File history of Canadian National Phase Application 2,708,007, filed Jun. 4, 2010, 56 pages.
File history of European National Phase Application No. 08754055.5, filed Aug. 6, 2009, Patent No. 2106494, issued Sep. 28, 2011, 396 pages.
File history of European National Phase Application No. 10075761.6, filed Dec. 15, 2010, 231 pages.
File history of European National Phase Application No. 11075202.9, filed Aug. 30, 2011, Patent No. 2402555, issued Apr. 3, 2013, 265 pages.
File history of European National Phase Application No. 11075204.5, filed Sep. 1, 2011, Patent No. 2402556, issued Mar. 20, 2013, 255 pages.
File history of Canadian National Phase Application No. 2,708,183, filed Jun. 4, 2010, 72 pages.
File history of co-pending U.S. Appl. No. 12/934,701, filed Sep. 27, 2010, 566 pages.
International Preliminary Report on Patentability, PCT/US09/04477, dated Feb. 17, 2011, 9 pages.
File history of European Patent Application No. 09741043.5, filed Aug. 5, 2009, issued May 9, 2012, EP 2229503 292 pages.
File history of European Patent Application No. 10075578.4, filed Aug. 5, 2008, 196 pages.
File history of Norwegian Patent No. NO/EP2106494, issued Jan. 2, 2012, 59 pages.
File history of co-pending U.S. Appl. No. 12/221,611, filed Aug. 5, 2008, 821 pages.
File history of Canadian National Phase Application No. 2,792,007, filed Oct. 3, 2012, 75 pages.
File history of co-pending U.S. Appl. No. 12/451,913, filed Dec. 3, 2009, 643 pages.
File history of Norwegian Patent No. NO/EP2229503, issued Aug. 20, 2012, 53 pages.
Office Action mailed Aug. 16, 2013, U.S. Appl. No. 12/451,913, filed May 3, 2010, 13 pages.
Certificate of Registration, NO/EP 2402555, Apr. 3, 2013, 1 page.
Certificate of Registration, NO/EP 2402556, Jun. 10, 2013, 1 page.
Response to Office Action dated Jan. 14, 2014, Canadian Patent Application No. 2,792,007, 12 pages.
Response to Completion Requirement dated Jan. 15, 2013, Canadian Patent Application No. 2,792,007, 7 pages.
File history of U.S. Appl. No. 12/451,913, filed May 3, 2010, 45 pages.
File history of U.S. Appl. No. 14/079,139, filed Nov. 13, 2013, 240 pages.
Complete file history of U.S. Appl. No. 12/221,611, filed Aug. 5, 2008, now U.S. Patent No. 8,576,090, issued Nov. 5, 2013, 828 pages.
Complete file history of U.S. Appl. No. 12/451,913, filed May 3, 2010, now U.S. Patent No. 8,689,868, issued Apr. 8, 2014, 1013 pages.
Office Action dated Feb. 19, 2013, Canadian Patent Application No. 2,708,183, 2 pages.
Response to Office Action dated Mar. 4, 2013, Canadian Patent Application No. 2,708,183, 3 pages.
Certificate of Grant, European Application No. 11075204.5, filed Sep. 1, 2013, now Patent No. EP2402556, issued Mar. 20, 2013, 1 page.
Communication regarding the expiry of the time limit within which notice of opposition may be filed, European Application No. 11075204.5, filed Sep. 1, 2013, now Patent No. EP2402556, issued Mar. 20, 2013, 1 page.
Office Action, Canadian Patent Application No. 2,792,007, mailed Jul. 15, 2013, 2 pages.

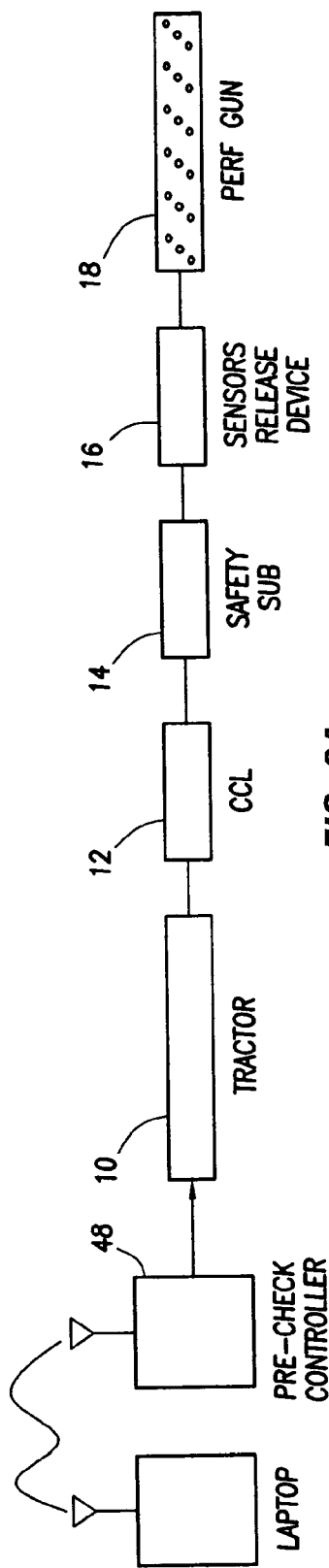
FIG. 3A
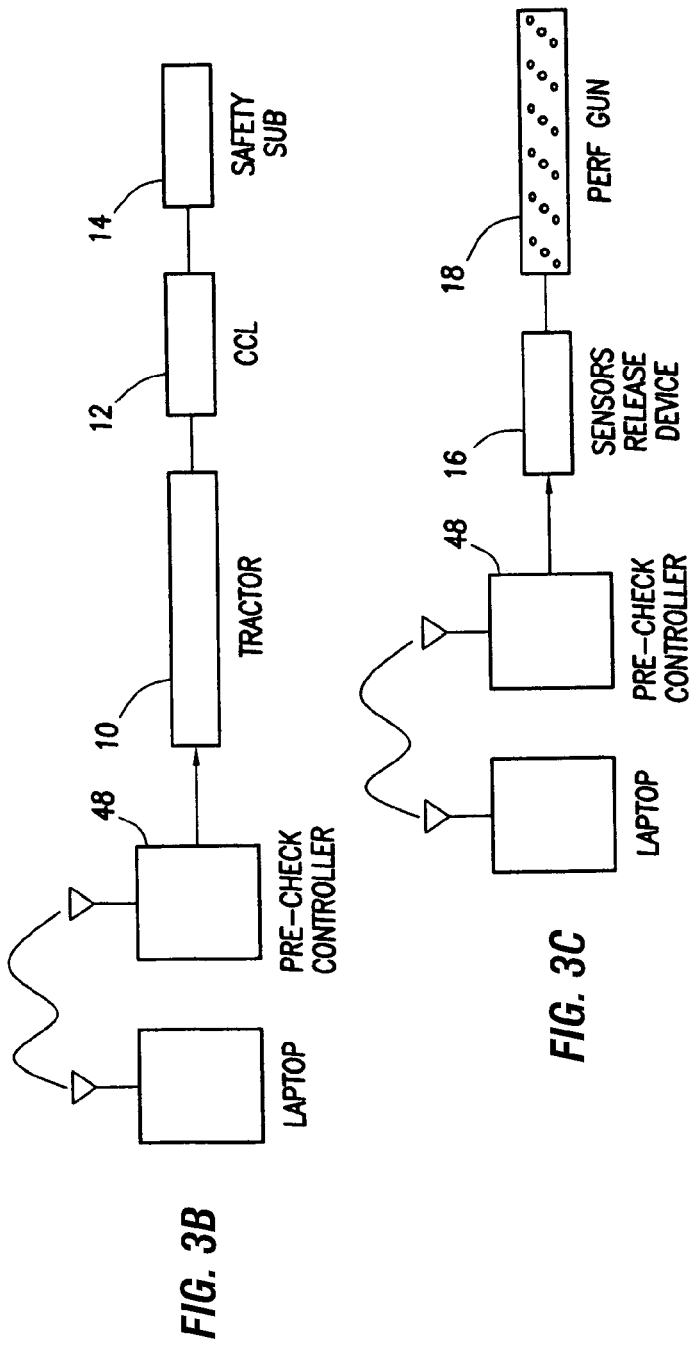
FIG. 3B
FIG. 3C

APPARATUS AND METHODS FOR CONTROLLING AND COMMUNICATING WITH DOWNHOLE DEVICES

RELATED APPLICATIONS

This application is a continuation of U.S. non-provisional patent application Ser. No. 12/221,611 filed on Aug. 5, 2008 which is a continuation-in-part of International Application No. PCTIUS200S/00200, TRACTOR COMMUNICATION/ CONTROL AND SELECT FIRE PERFORATING SWITCH, filed Jan. 7, 2008, which related patent application is hereby incorporated in its entirety by this specific reference thereto.

BACKGROUND OF THE INVENTION

Perforating guns are used to complete an oil or gas well by creating a series of tunnels through the casing into the formation, allowing hydrocarbons to flow into the wellbore. Such operations can involve multiple guns that create separate perforations in multiple producing zones where, each gun is fired separately. Operations can also involve single or multiple guns in conjunction with setting a plug. The guns are typically conveyed to the producing zone(s) by wireline, tubing or downhole tractors.

Switches are typically coupled to each detonator or igniter in a string of guns to determine the sequence of firing. One type of switch uses a diode that allows two guns (or a gun and a plug) to be fired, one with positive and the other with negative voltage. Percussion switches are mechanical devices that use the force of detonation of one gun to connect electrically to the next gun, starting with the bottom gun and working up, and are typically used to selectively fire three or more guns. The devices also disconnect from the gun just fired, preventing the wireline from shorting out electrically. A problem with percussion switches is that if any switch in the string fails to actuate, the firing sequence cannot continue, and the string must be pulled from the wellbore, redressed and run again.

More recently, electronic switches have been used in select-fire guns. Unlike percussion-actuated mechanical switches, selective firing of guns, continues in the event of a misfired gun or a gun that cannot be fired because it is flooded with wellbore fluid. One commercial switch of this type has downlink communication but is limited in the number of individual guns that can be fired in one run. As with the percussion switches, the system relies on detecting changes in current at the surface to identify gun position, which may not be a reliable method to identify gun position in a changing environment.

Another type of electronic switch has both downlink and uplink communication and is not as limited in total number of guns that can be filed in a, run, but is somewhat slow to fire because of the long bi-directional bit sequence required for communication. Both downlink and uplink communications use a unique address associated with each switch to identify correct gun position prior to firing.

A common problem in operating downhole devices is keeping unwanted power from causing catastrophic action. Examples include a perforating gun receiving voltage that accidentally fires the gun downhole, a setting tool being activated prematurely, a release device suddenly deploying, and high voltage destroying electronics in a well logging tool because the power rating is exceeded. A solution to this problem is to stop unwanted power by inserting a blocking mechanism between the power supply and the downhole device to be protected. In a standard perforating job, the power to log and to detonate the perforating gun is located at the surface. Power can also be generated downhole using batteries. Recently, there have been detonator designs that incorporate electronics to block unwanted power from firing a gun.

The high voltage needed to power a downhole tractor presents particular problems protecting the tool string conveyed by the tractor. The surface voltages powering a tractor are typically 1500 VDC or 1000 VAC. Tractors normally have an internal design that prevents tractor power from being transmitted below the tractor, but sometimes the circuitry fails or does not work properly, allowing induced voltage or direct voltage to pass through the tractor into the tool string below. To protect the tool string, which can include perforating guns or logging tools, one or more special safety subs are located between it and the tractor. Some of the subs use electrical/ mechanical relays to block accidental tractor power; others use electronic switches that are commanded to turn off and on using communication messages from the surface that contain a unique address.

More recently, the American Petroleum Institute (API) has issued a recommended practice for safe tractor operations, RP 67, that includes a recommendation that the tractor be designed to block unwanted voltage from passing through and that the design is free of any single point failure. In addition, there must be an independent, certified blocking device between the tractor and any perforating gun to prevent unwanted power from being applied to a gun.

BRIEF SUMMARY OF EXAMPLES OF THE INVENTION

An object of the present invention to provide a system that prevents tractor power from migrating past the tractor. Elements of this design are employed in a separate safety sub that acts as a safety barrier to block unwanted power to the tool string.

Another object of the present invention is to provide a command and response system featuring fast bi-directional communication while allowing a large number of guns to be fired selectively. The system requires communication through a cable and can include communications with a downhole tractor and safety sub. Multiple embodiments are provided using a state machine as part of the electrical switch to command and identify status within the switch. In one embodiment, the gun position before firing is uniquely identified by keeping track of the sequence of states. In the another, correct gun position is established by state and an uplink of a unique identifier. Unlike bi-directional communication electronic switches, a returned downlink of the identifier is not necessary.

Other objects of the present invention, and many advantages, will be clear to those skilled in the art from the description of the several embodiment(s) of the invention and the drawings appended hereto. Those skilled in the art will also recognize that the embodiment(s) described herein are only examples of specific embodiment(s), set out for the purpose of describing the making and using of the present invention.

The present invention provides a system for bi-directional communication with a tractor that includes means for connecting and disconnecting electrical power below the tractor. The system also allows bi-directional communication to sensors contained in the tractor for monitoring certain operational functions. The communication and uplink data transmission can occur with tractor power either off or on. A separate safety sub uses common elements of the bi-directional communication and switching to block unwanted voltage and to pass allowable voltage. In addition, methods are disclosed for disconnecting a shorted wireline below the tractor or below the safety sub.

Also provided is a system for bi-directional communication with other devices such as selectively fired perforating guns, setting tools, release devices and downhole sensors including a system to select and fire specific guns in the sting. Each switch unit is interrogated and returns a unique address that is retrieved under system control from the surface. Each location within the gun string is identified with a particular address.

In another aspect, the present invention provides an embodiment in which every switch unit is identical without an identifying address. Each switch unit's sequential position in the gun string is identified by keeping proper track of the number of surface commands along with the uplink status from an embedded state machine. This predetermined chain of events provides surface information for determining the unique location of each switch unit in a given gun string. These enhancements allow for faster communication, initialization and firing time. As an added feature, all switches are exactly the same with no unique embedded address to program and manage.

Also provided is a method for controlling one or more devices on a tool string in a wellbore with a surface computer and a surface controller comprising the steps of sending a signal down a cable extending into the wellbore to one or more control units located on the devices on the tool string, each control unit comprising a state machine for identifying the status of the control unit, processing the signal with the state machine, controlling the position of one or more switches located on the device on the tool string when the state machine for the device processes a valid signal, and returning a signal validating switch action to the surface computer.

In another aspect, a method is provided for switching wireline voltage between a tractor motor and the tractor output in a downhole tool string including a tractor comprising the steps of sending a signal to a control unit on the tractor from the surface, processing the signal with a state machine on the tractor for controlling the position of one or more switches located in one or more circuits connecting the wireline to either the tractor motor or a through wire that connects to the tool string; and returning a signal validating switch action to the surface.

Also provided is a method for switching between a safe mode for tractoring and a perforating mode for perforating in a tool string including a tractor and a perforating gun that has been lowered into a well on a wireline comprising the steps of sending a signal to a control unit on the tractor from the surface, processing the signal with a state machine for controlling the position of one or more switches located in one or more circuits for connecting the wireline to either the tractor motor or a through wire connecting to the perforating gun, and returning a signal validating switch action to the surface.

Also provided is an explosive initiator integrated with a control unit comprising means for receiving a signal from a cable, a microcontroller including a state machine for validating a signal from the signal receiving means, a switch responsive to an output from the microcontroller when a signal is validated by the state machine; and an explosive initiator connected to the switch.

In another aspect, the explosive initiator is integrated into a switch unit for use in connection with a perforating gun to be lowered into a wellbore on a cable comprises means for receiving a downlink signal through a cable to which a perforating gun is to be lowered into a wellbore, first and second transmitters operating at low and high current levels for transmitting uplink signals through the cable, and a microprocessor in electrical communication with the signal receiving means and the first and second transmitters that includes a state machine for validating a signal from the signal receiving means and that returns an uplink signal using either the first or said second transmitter through the cable. A switch is responsive to an output from the microcontroller when a signal is validated by the state machine and an explosive initiator is operably connected to the switch.

In yet another aspect, the present invention provides an apparatus for checking downhole tools function before lowering into a wellbore comprising a pre-check controller, electrical connections between the pre-check controller and one or more downhole tools, and one or more control units mounted on each downhole tool that are adapted for bi-directional communication with the pre-check controller, each control unit comprising a state machine for identifying the status of each control unit, the pre-check controller being adapted to send a plurality of commands to the respective control units.

Also provided is a method for checking one or more devices in a tool string before lowering the tool string into a wellbore comprising the steps of sending a signal to control units located on the devices, each control unit comprising a state machine for identifying control unit status, and processing the signal with the state machine. The switch(es) located on the device is/are controlled when the state machine for that device processes a valid signal and a signal validating switch action is returned from the control unit.

Also provided is a communication system that allows serial and parallel control of downhole devices including tractors, auxiliary lmctor tools, well logging tools, release mechanisms, and sensors. The advantage of parallel control is that individual devices can be interrogated without going through a series path, thereby being more accessible. Each tool in the parallel arrangement has a control unit that carries a tool identifier as part of its uplink communication. A detonator that contains an integral switch unit is also provided.

Also provided is a system including several components as follows:

Tractor
1. Use of dual processors, each controlling a set of switches for connecting a W/L to either a tractor motor or a tool below for directing the wireline for powering the tractor power or providing a direct through wire mode.
2. A Zener diode in series with the final output to de-couple the wireline in case of a short, thereby allowing communication to the micro in order to actuate a switch to disconnect a shorted circuit to regain tractor functions.
3. An inline series transformer on the output of the tractor with one end of the primary winding connecting directly to the tractor output while the other end connecting to tools below. In addition, the output end of the transformer primary is capacitive coupled to ground. In the event of a shorted W/L, a high frequency signal can be sent down the wireline and produce power on
   the transformer secondary for actuating a switch such as a motorized piston switch
   or a form C switch, thereby clearing the shorted wireline.
4. Voltage blocker to disconnect in the event of a short caused by gun firing and allows a predetermined voltage to be applied to the wireline without being connected to the gun string below.
5. Pre-selecting W/L switches within a tractor and remaining in a fixed or latched position for further use by another service operation.

6. Provide real time status for temperature.
7. Provide real time status for downhole voltage.
8. Gang switch for control and status in a piston contact geometry.
9. Design applies to both AC or DC driven tractors.
10. Supports 2-way communication.
11. Receives downlink commands.
12. Transmits switch status.
13. Transmits sensor data (Temp, V, RPM, etc.).
14. No single point failures in Tractor itself
15. Complies with RPI 67.

Surface Controller
1. Wireless interface for sending and receiving data between a laptop computer and a Surface Controller.
2. Laptop for providing control and human interface via special program, monitoring system status, archiving data, recording job history, and providing Bluetooth communication between Laptop and Surface Controller.
3. Interfaces between Laptop and Tractor.
4. Sends commands and solicits data.

Surface Computer
1. Wireless connection to surface controller.
2. Monitor which power supply is connected between tractor or perforating and run appropriate program.
3. Control tractor pre-check, tractor operations including communications, sending commands, and power for performing.
4. Communicate using a power line carrier during tractor operation with either AC or DC power.
5. Correlation (CCL) during tractor operation.

Safety Sub
1. Use of dual processors, each controlling a set of switches for connecting a perforating gun string to either ground or to a downhole W/L.
2. A Zener diode in series with the final output to de-couple the wireline in case of a short thereby allowing communication to the microcontroller to actuate a switch to disconnect a shorted circuit to regain tractor functions.
3. Provide an inline transformer on the output of the Safety Sub having the output capacitive coupled to ground. In the event of a shorted W/L, a high frequency signal can be sent down the wireline and produce power on the transformer secondary for actuating a switch such as a motorized piston switch or a form C switch, thereby clearing the shorted wireline, and produce power on the transformer secondary for actuating a piston switch and. clearing the shorted wireline in the same way as with the tractor.
4. Voltage blocker to disconnect in the event of a short caused by gun firing and allows a predetermined voltage to be applied to the wireline without being connected to the gun string below.
5. A wireless interface for sending and receiving data between a laptop computer and a Surface Controller.
6. Pre-selecting Safe Sub W/L switches and remains in a fixed position for further use by another service operation.
7. Supports two-way communication.
8. Receives Safe and Perf commands from surface.
9. Transmits switch status.
10. Independent Unit with no single point failures.
11. Uses same design as portion of tractor electronics.
12. Complies with RP67.

In yet another aspect, a switch unit is provided that is responsive to downlink communication signals for use in a perforating gun, release device, or explosive device for lowering into a wellbore. The switch unit comprises a switch for activating the perforating gun, release device, or explosive device, a microprocessor operably connected to the switch, and first and second uplink communications transmitters operating at low and high current levels, respectively, the microprocessor selecting either the first or the second current level transmitter depending upon whether downlink communication signals are transmitted before or after lowering into a wellbore.

Also provided is a method of communicating with a switch unit located on a perforating gun, release device, or explosive device for lowering into a wellbore comprising the steps of sending a signal to the switch unit, processing the signal with a state machine comprising the switch unit, controlling the position of one or more switches comprising the switch unit, and returning a signal validating switch status from the switch unit at a current level in the range of from about 4 milliamps to about 15 milliamps. The method contemplates the further step of increasing the current level of the return signal after the perforating gun, release device, or explosive device is lowered into the wellbore, and in one embodiment, the current level is increased to a range of from about 10 to about 100 milliamps.

Also provided is a method of switching between a safe mode for tractoring and a perforating mode in a tool string including a tractor and a perforating gun for lowering into a wellbore on a wireline comprising the steps of sending a signal to a control unit on the tractor, the control unit comprising a state machine for processing the signal and controlling the position of a switch for connecting the wireline to either the tractor motor or a through wire connecting to the perforating gun while blocking negative voltage through the wireline, and returning a signal validating switch position to the surface.

BRIEF DESCRIPTION OF THE SEVERAL VIEWS OF THE DRAWINGS

FIG. 3A, shows a Surface Controller interfacing with a Tractor for providing power and communications.

FIG. 3B shows a Surface Controller for checking Tractor functions only.

FIG. 3C shows a Surface Controller for checking only the Release Device, Sensors and select switches.

FIGS. 9D-1 and 9D-2 are block diagrams of a Safety Sub incorporating a voltage blocker.

DETAILED DESCRIPTION OF EXAMPLES OF THE INVENTION

Figure 1:
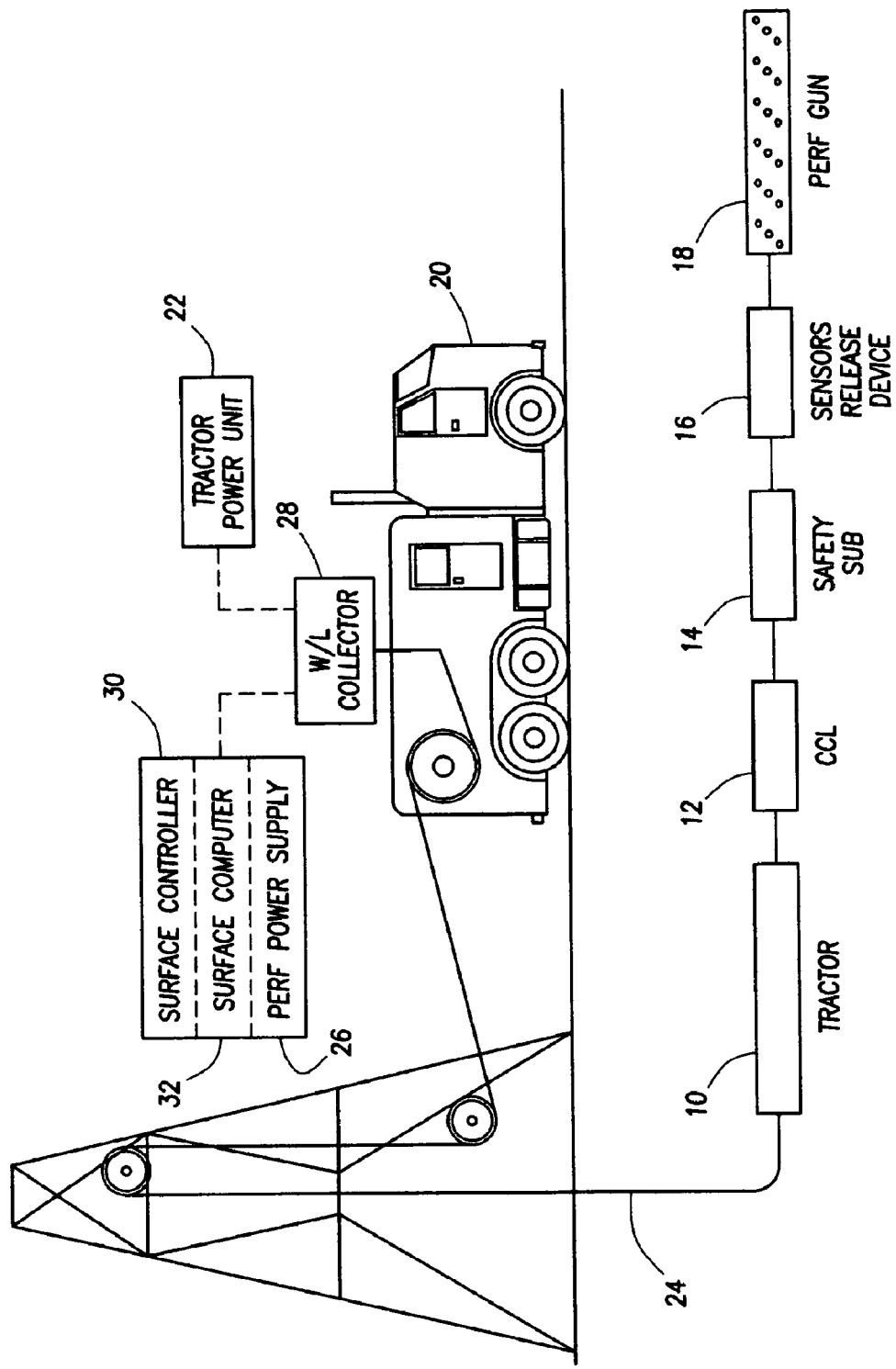
FIG. 1 is a diagram of a tool string including a perforating gun string.

Referring now to the figures, FIG. 1 is a diagram of a tool string including a perforating gun string, downhole Sensors and Release Device, Safety Sub for preventing unwanted voltages from getting to the gun string, Casing Collar Locator (CCL) or other positioning device for locating the gun string within a cased well bore, Tractor Unit for pushing tools along a horizontal well bore, and wireline unit containing a wireline wench, Surface Controller, computers and power supplies. A wireline collector provides a method for selecting either the Surface Controller or the Tractor Power Unit.

Figure 2:
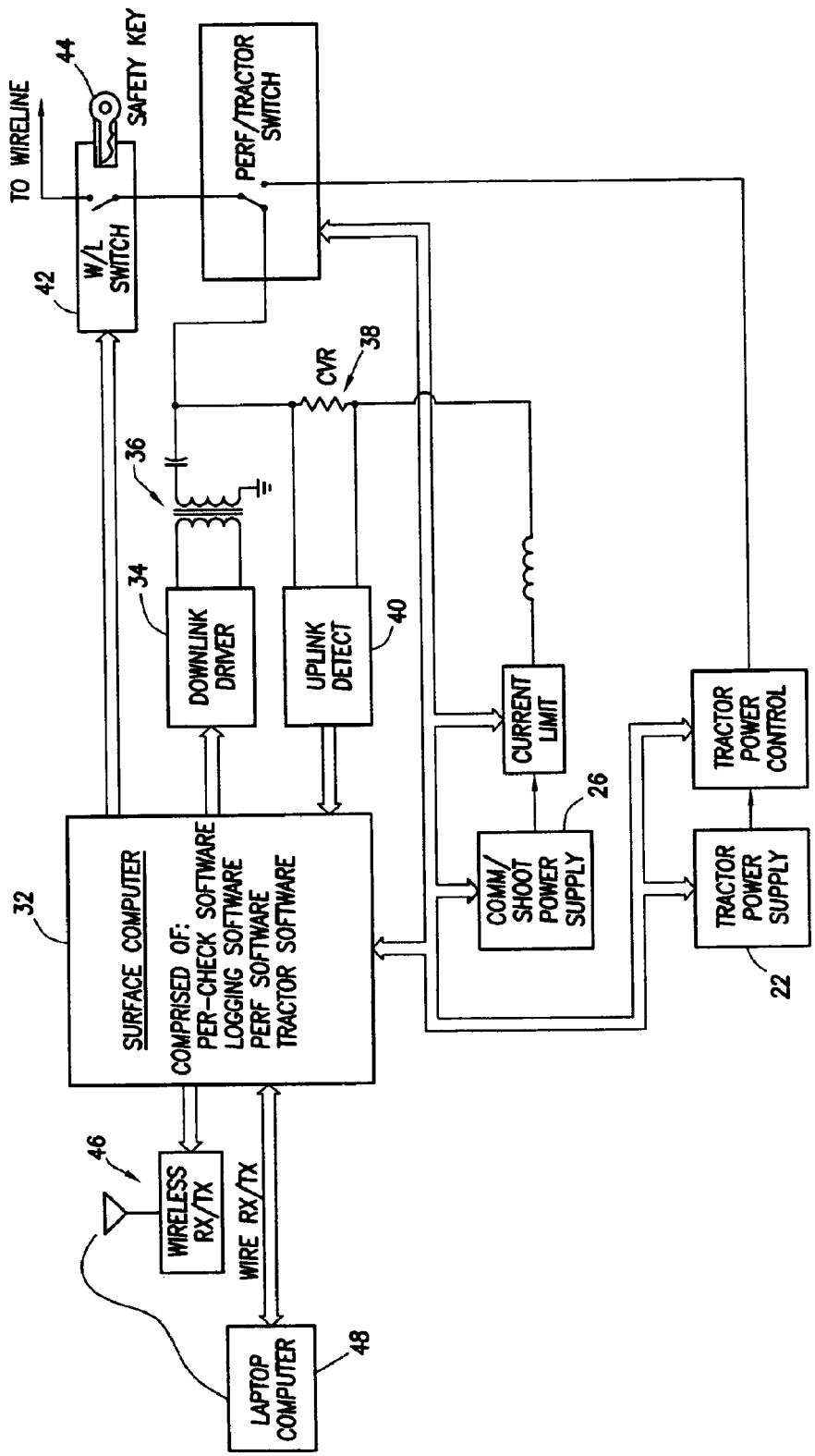
FIG. 2 is a block diagram of a Surface Controller.

FIG. 2 is a block diagram of a Surface Controller that integrates perforating, tractor operations, logging and other well services, including pre-checks for tools at the surface. This pre-check would include, but is not limited to, Tractor and Safety Sub operations, select fire switches, sensors, release devices and communication links associated with logging and perforating operations and tractoring. The Surface Controller also supports receiving and transmitting signals to a Tractor, Safety Sub, Release Device, Sensors and Switch Unit. Controlling power supplies, archiving job data, program control, and safety barriers are also functions of the Surface Controller.

FIG. 3 shows tool strings being prepared for downhole service. In FIG. 3A, a Surface Controller interfaces to a Tractor for providing power and communications. Typical pre-checks and set-ups for the Tractor include setting all switches to an initial condition for safe operation and checking communication functions. Communications and functions are also checked for the Sensors, Release Devices and select switches within the perforating gun. FIG. 3B shows a Surface Controller for checking Tractor functions only. FIG. 3C shows a surface check of only the Release Device, Sensors and select switches. Any combination of tools can be tested at the surface. A laptop computer provides control to the Surface Controller through a wireless connection.

Figure 4:
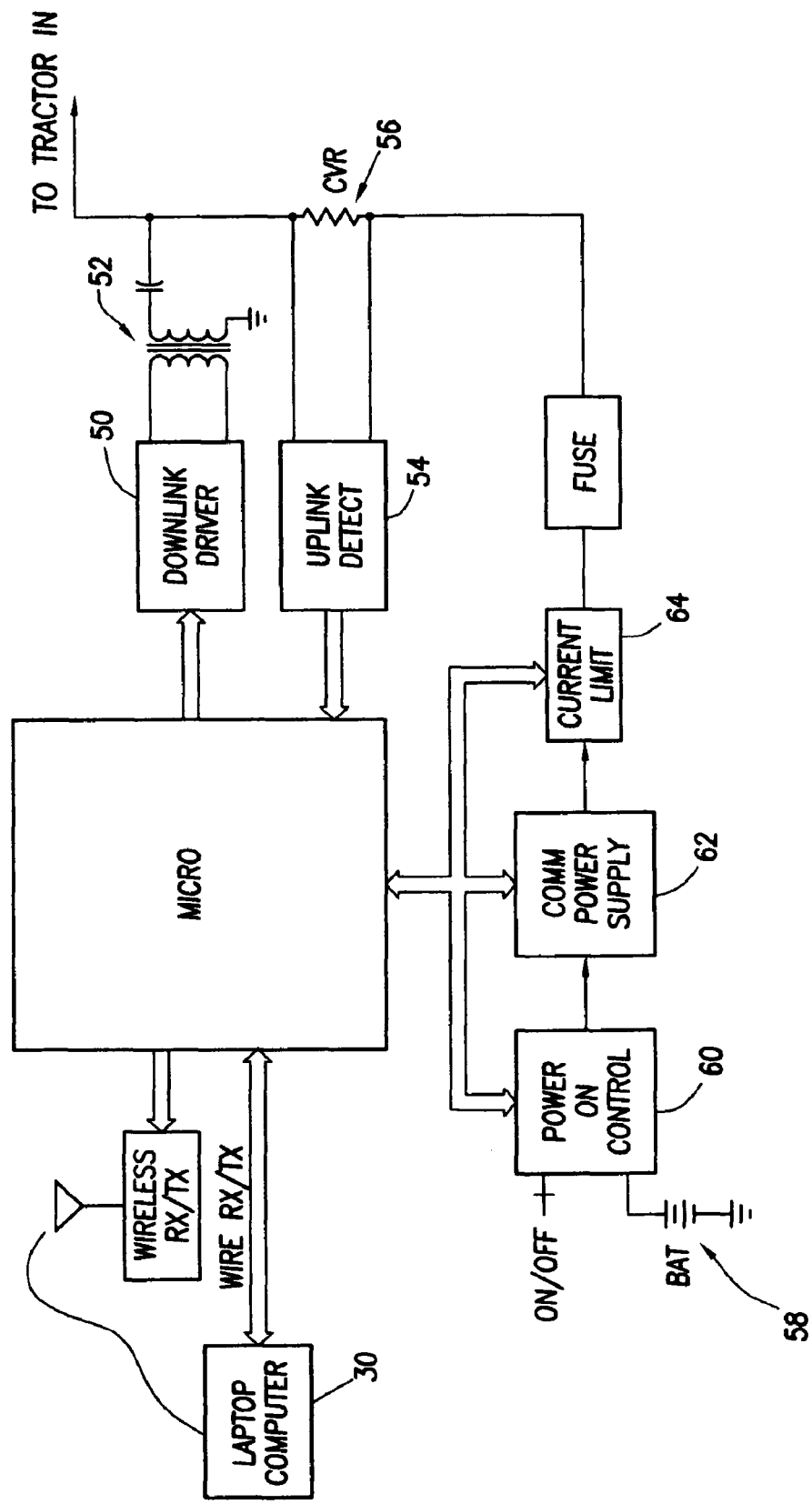
FIG. 4 shows a Pre-check Controller used in the pre-check shown in FIG. 3.

FIG. 4 shows a Pre-check Controller used in the pre-check shown in FIG. 3.

Figure 5:
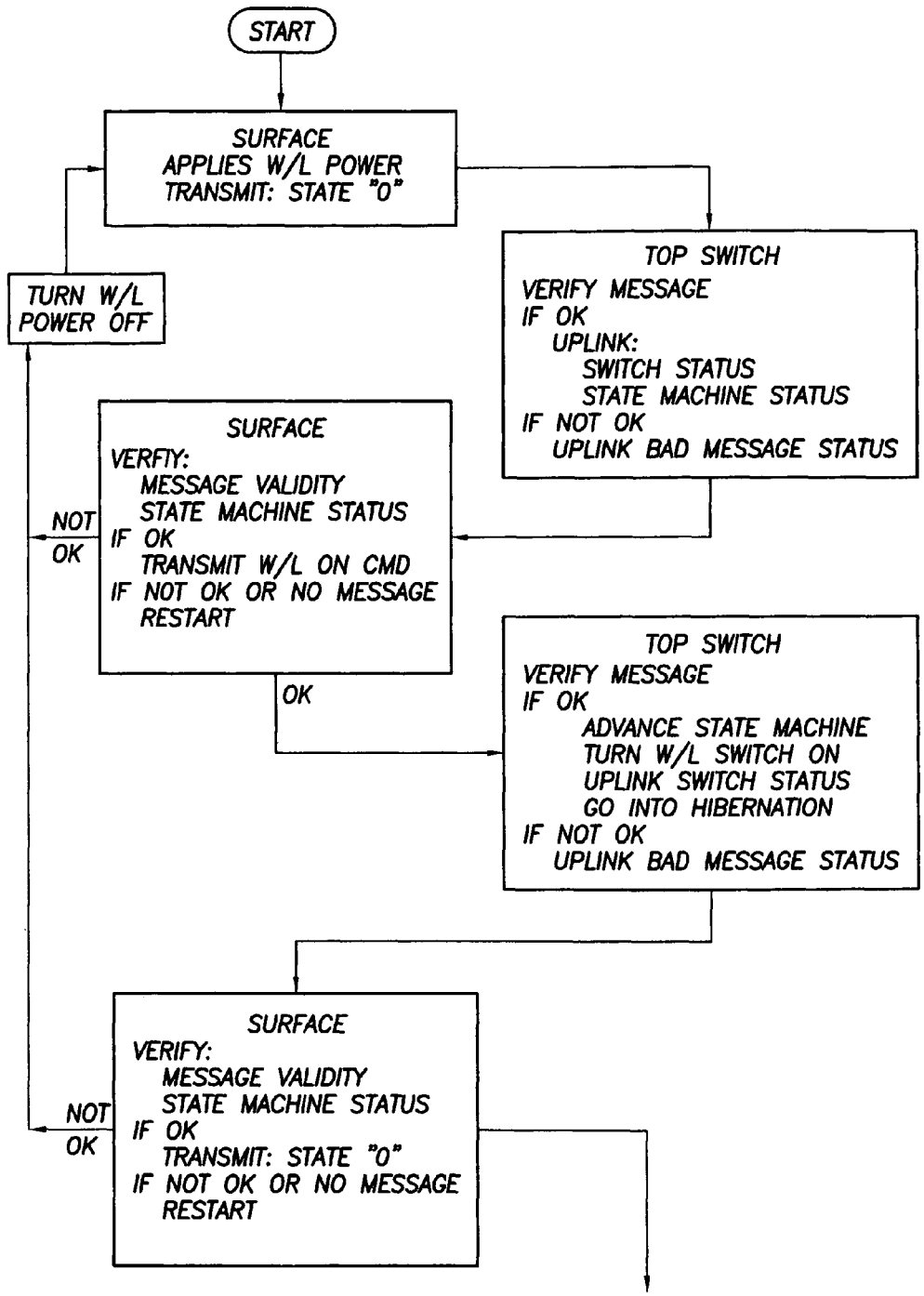
FIG. 5 is a flow chart describing program control for performing a pre-check on a gun string.

FIG. 5 is a flow chart describing program control for performing a pre-check on the gun string containing selective Switch Units prior to running downhole.

Figure 6:
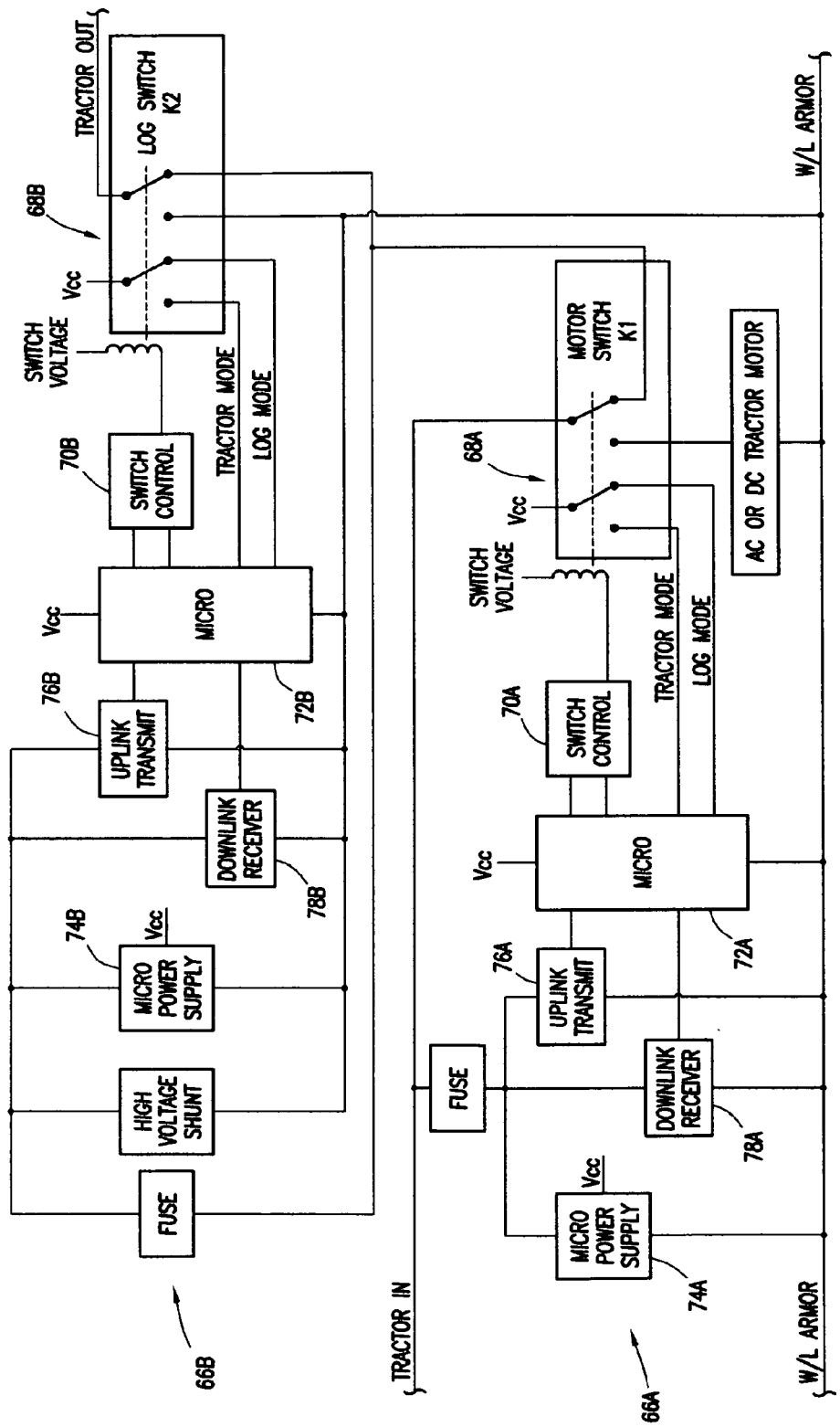
FIG. 6 is a block diagram of Tractor Controller electronics.
Figure 7A:
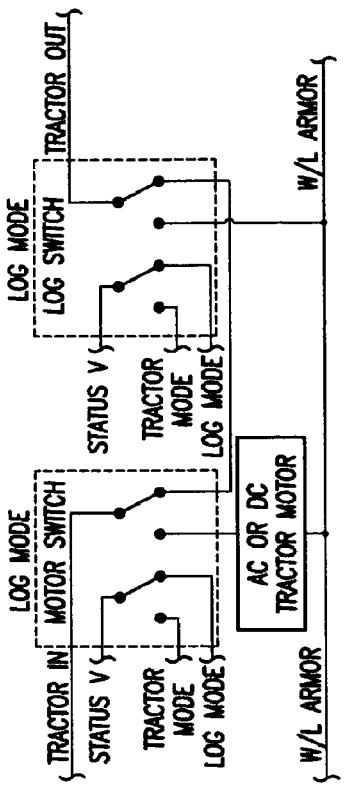
FIGS. 7A, 7B, 7C and 7D show a combination of positions for two sets of form C switches.
Figure 7B:
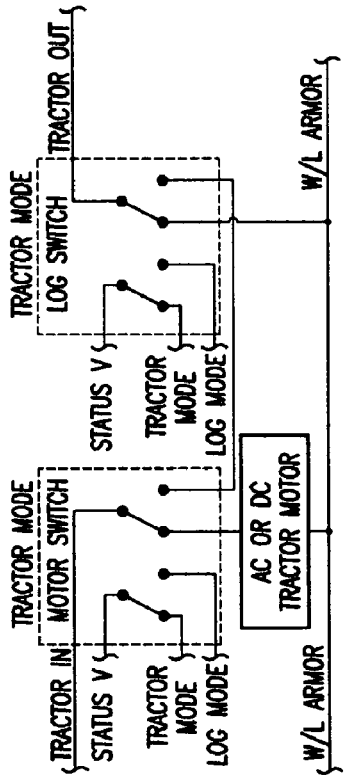
Figure 7C:
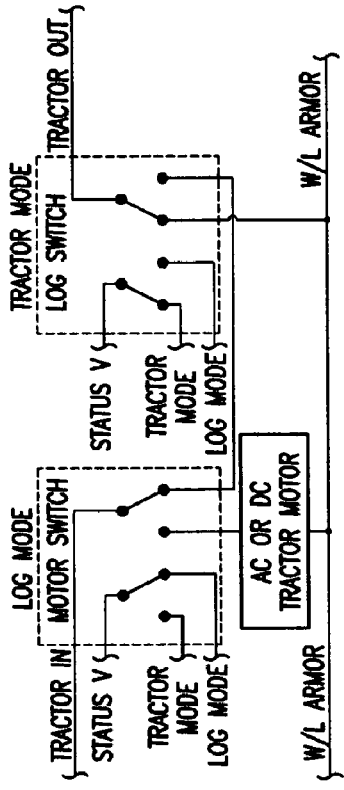
Figure 7D:
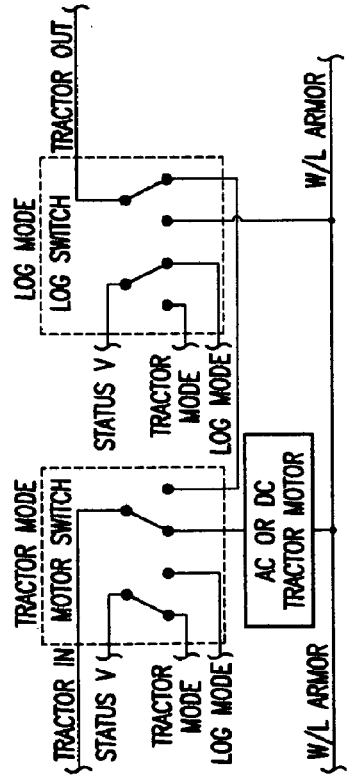

FIG. 6 is a block diagram of the Tractor Controller electronics for sending and receiving commands and controlling switches for tractor operation or perforating events.

FIG. 7 shows the combination of position for two sets of form C switches. No single switch can be positioned such that the tractor would be unsafe for perforating.

Figure 8:
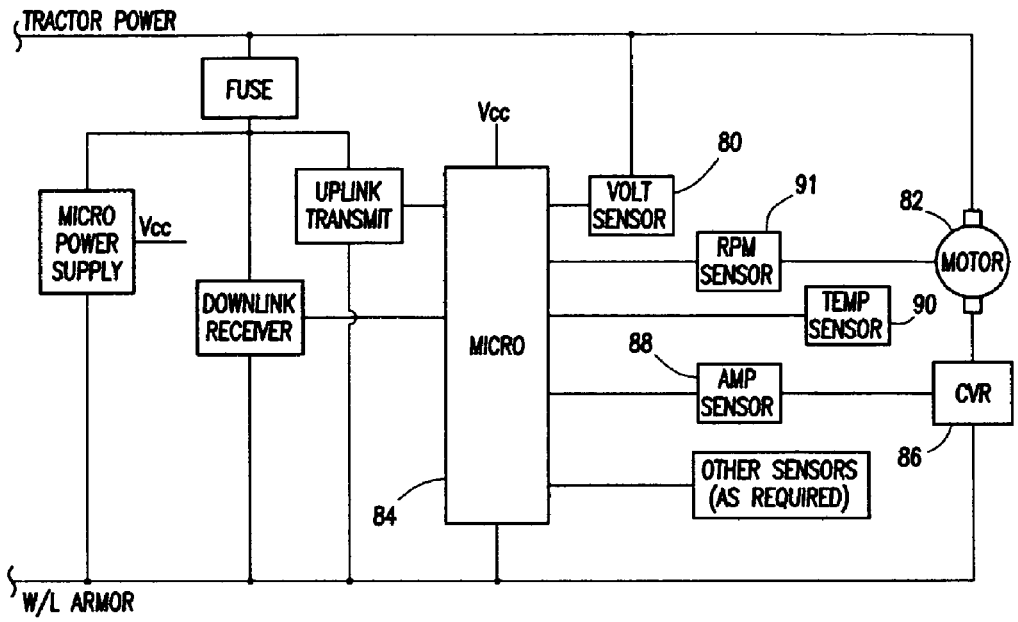
FIG. 8 is a block diagram of various sensors within the tractor electronics.

FIG. 8 is a block diagram of various sensors within the tractor electronics.

Figure 9B:
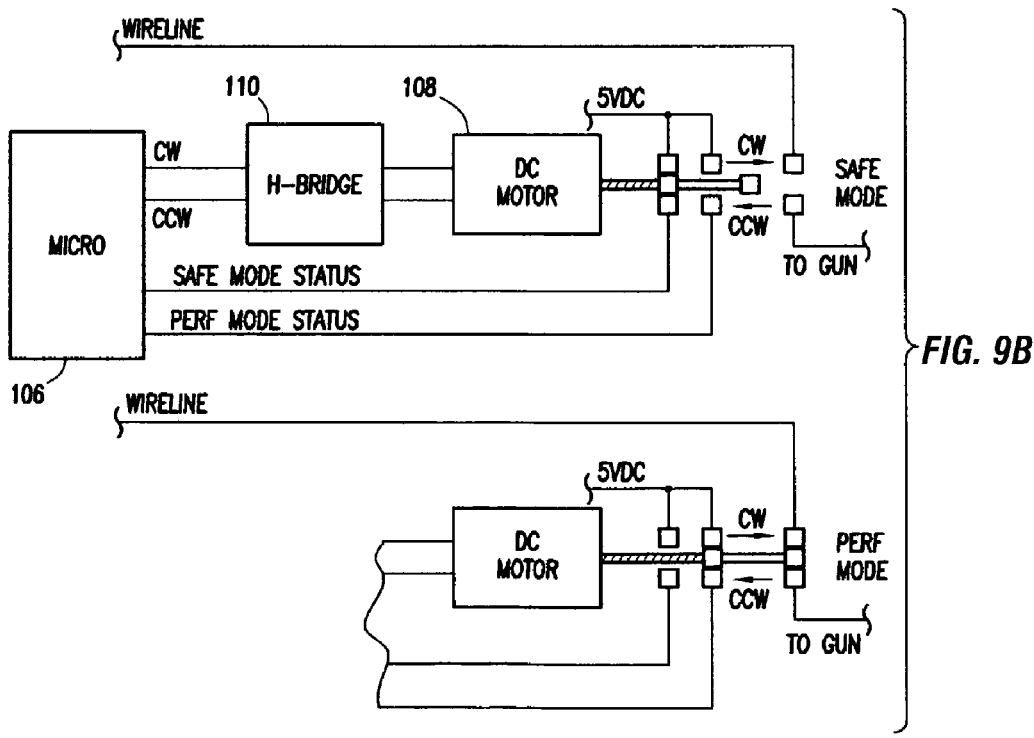
FIGS. 9A, 9B, and 9C are block diagrams of different embodiments of the circuitry of a Safety Sub.
Figure 9A:
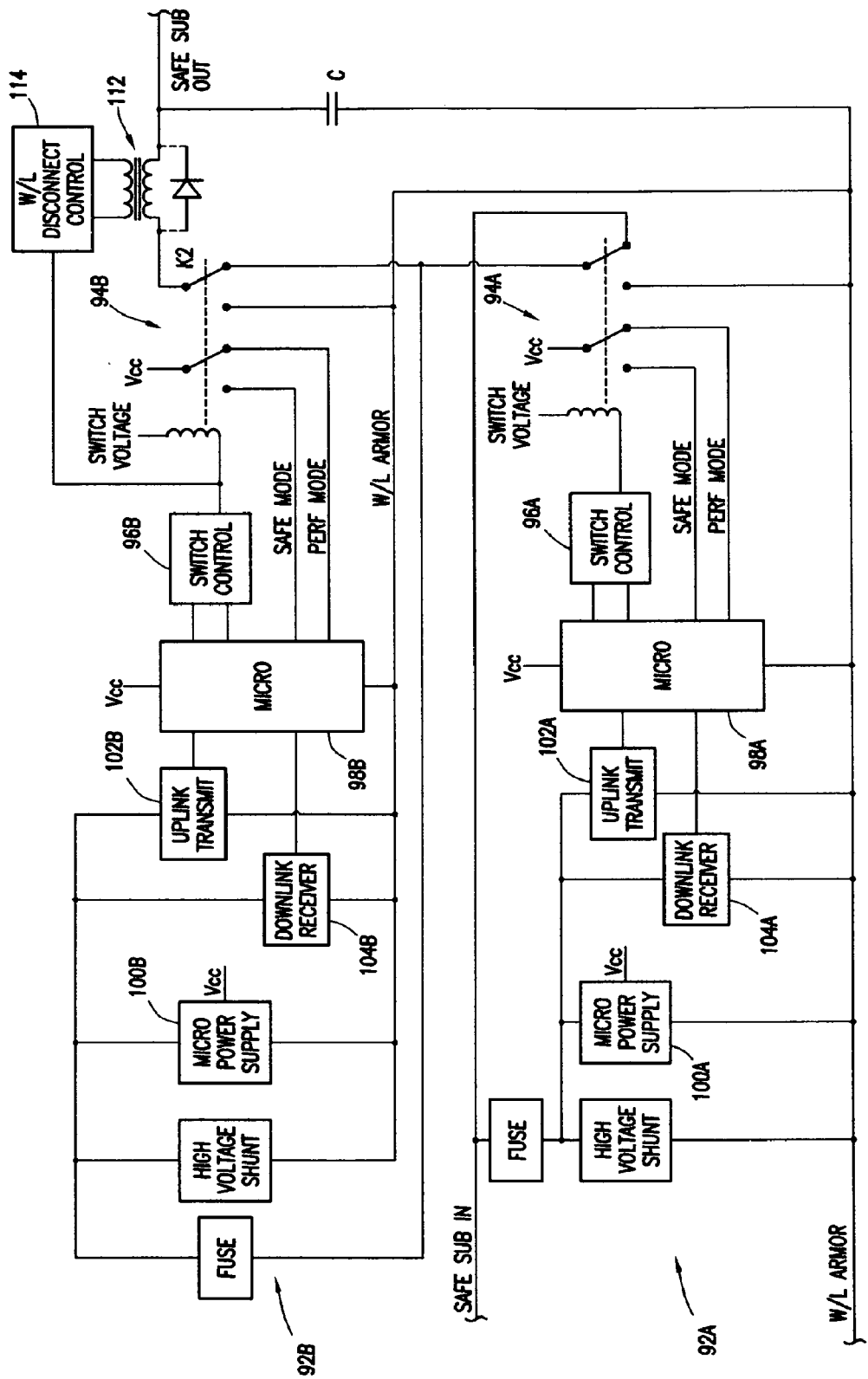
Figure 9C:
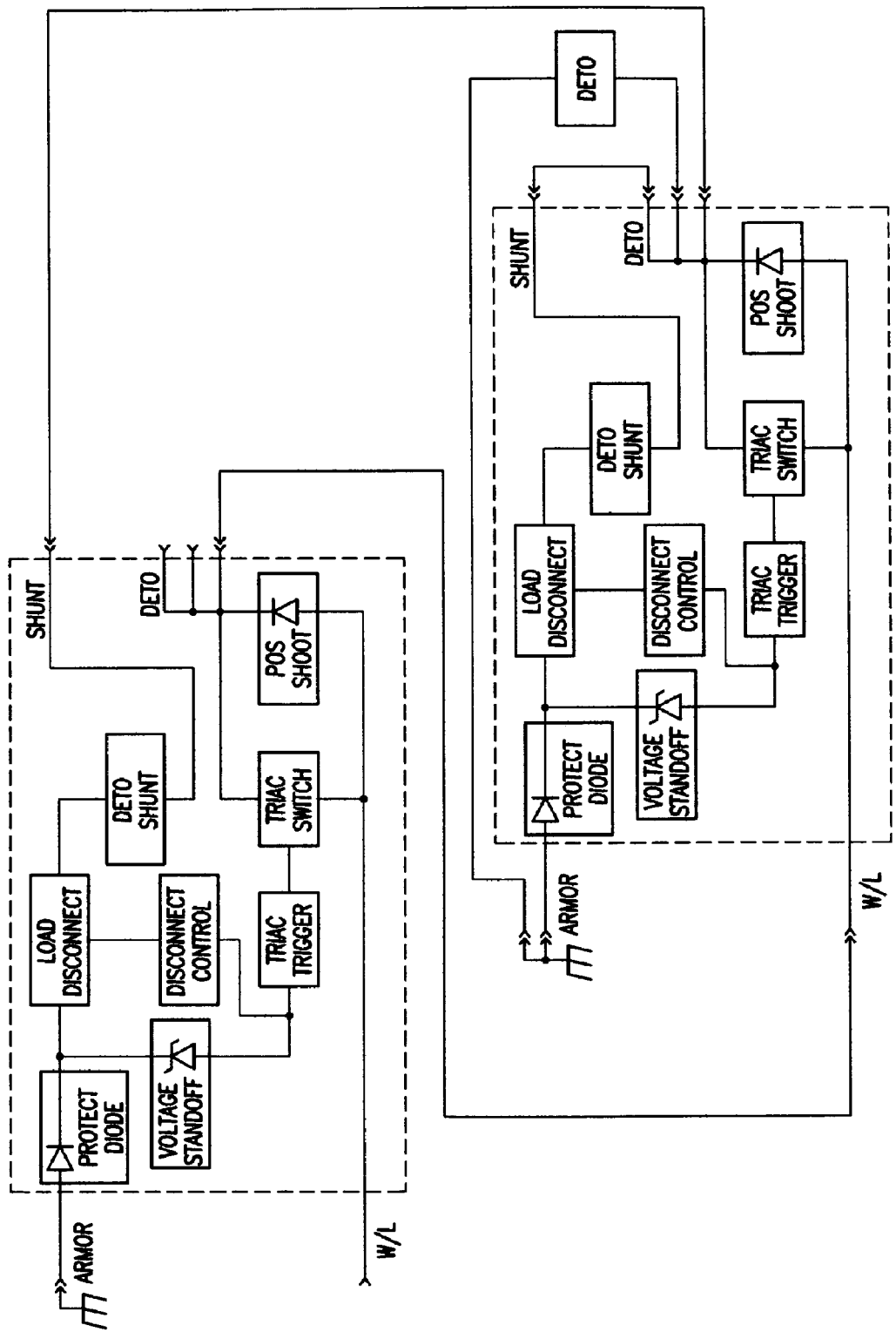
Figures 1, 9D:
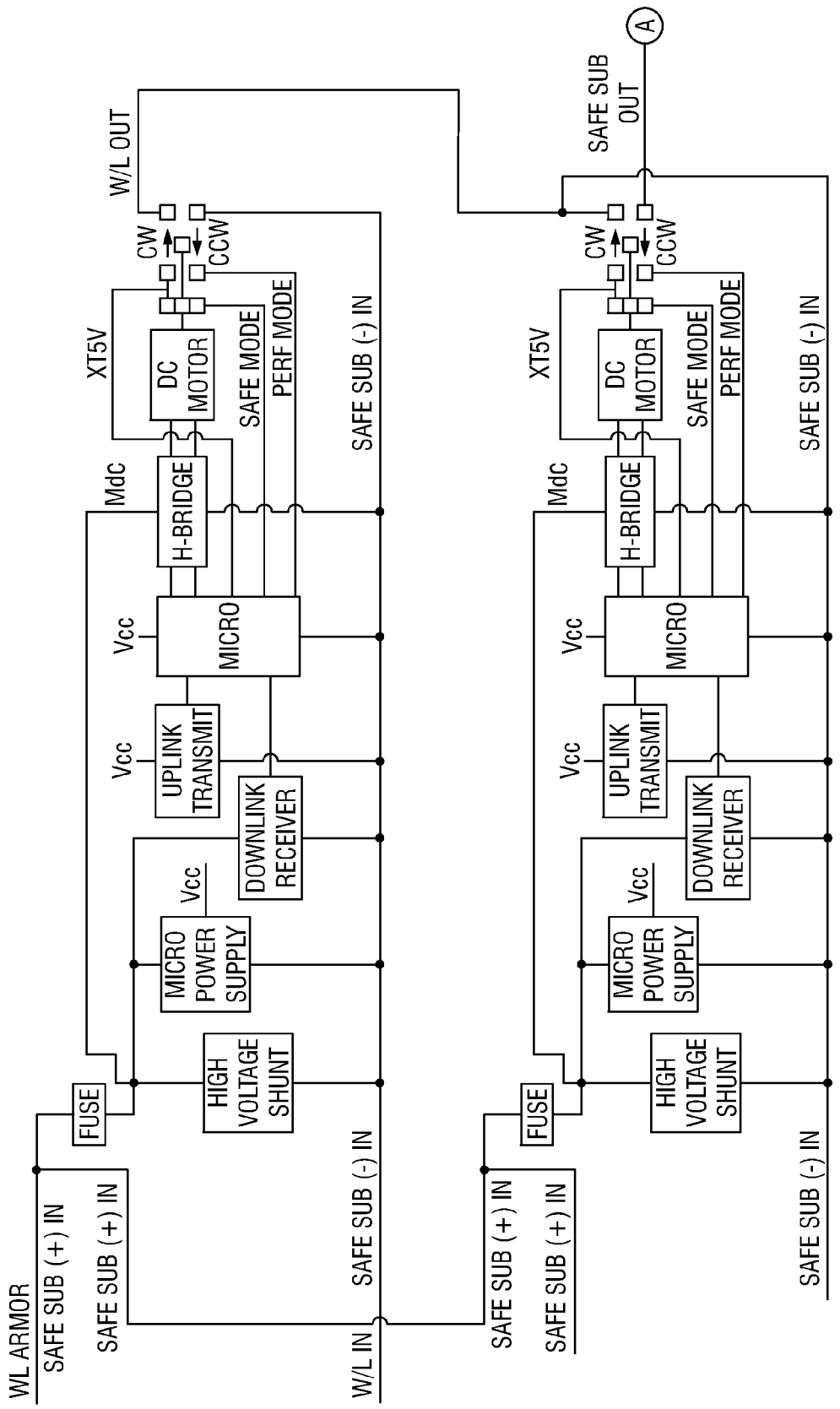
Figures 2, 9D:
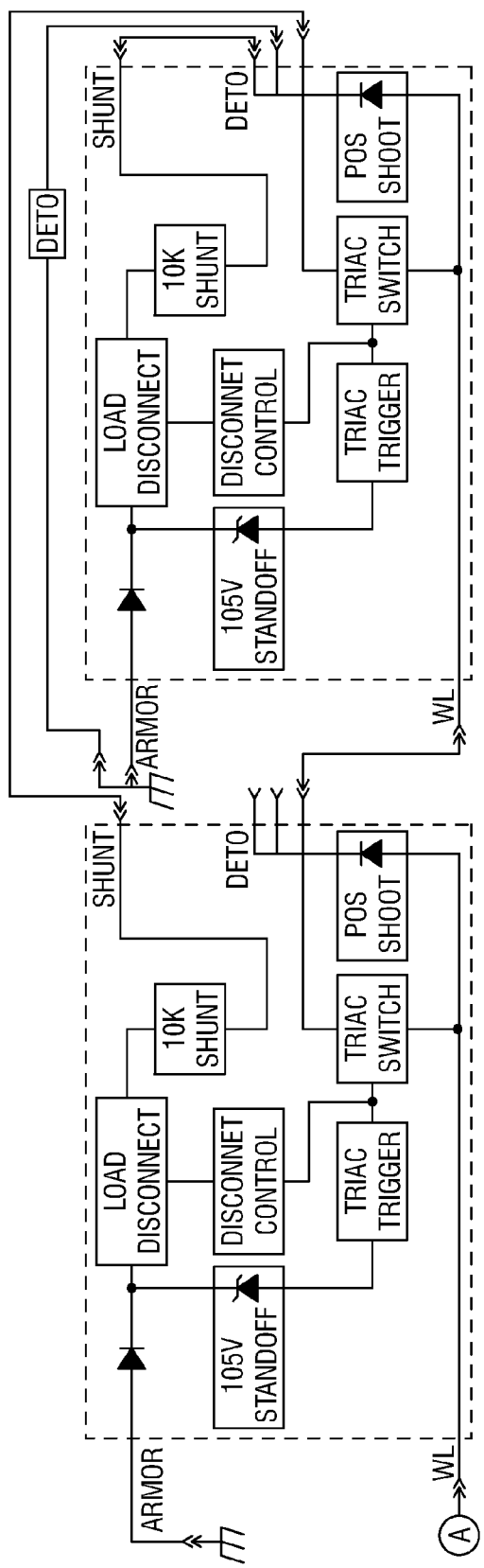

FIGS. 9A, 9B, and 9C are block diagrams of different embodiments of the circuitry, including a voltage blocker, of a Safety Sub that resides on top of a perforating gun string. FIGS. 9D-1 and 9D-2 are block diagrams of a Safety Sub incorporating a voltage blocker of the type shown in FIG. 9C.

Figure 10:
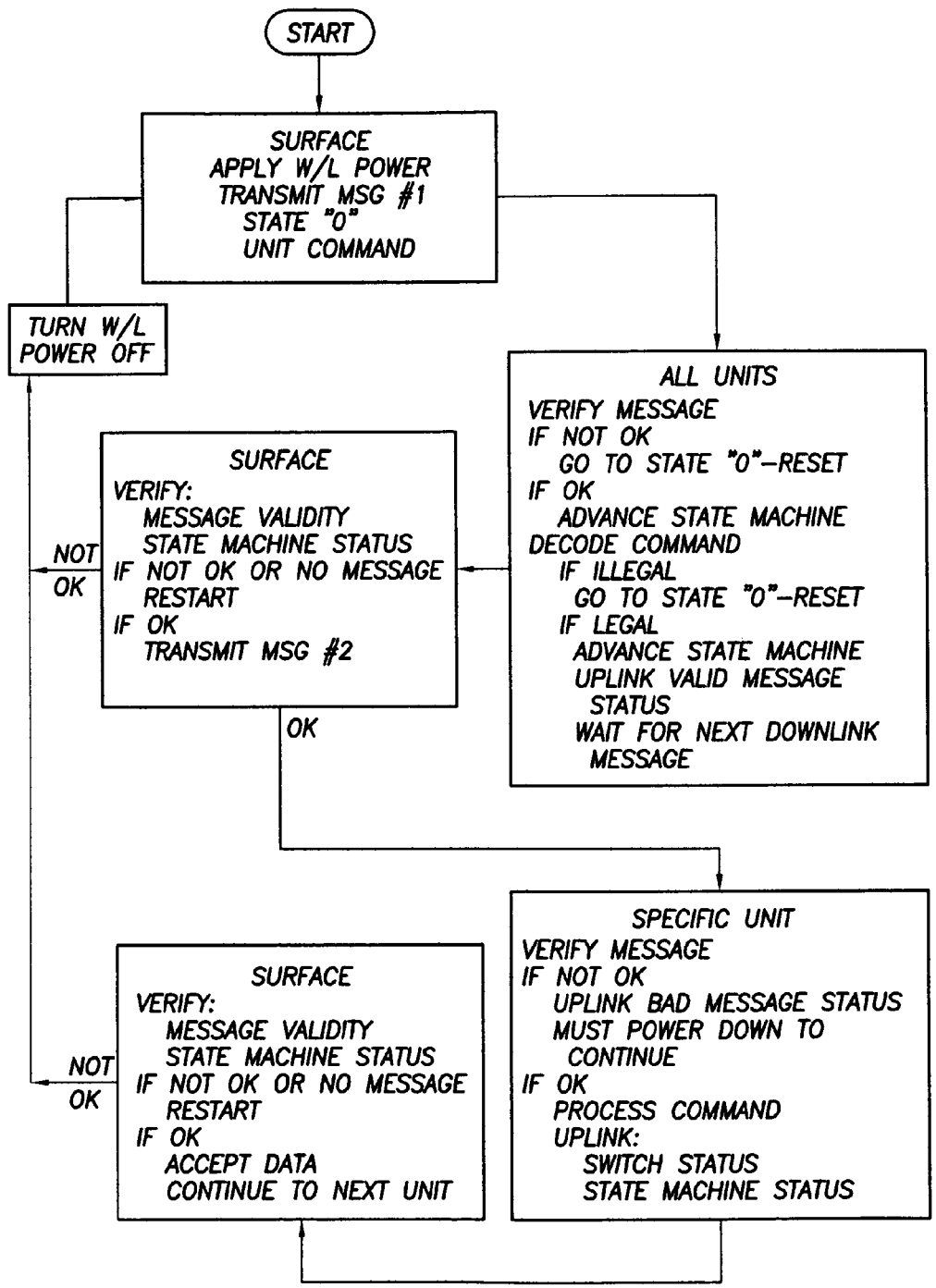
FIG. 10 is a flow chart for a single State Machine.

FIG. 10 is a flow chart for a Tractor Controller single State Machine for controlling either tractor electronics, shown in FIG. 6, or Safety Sub, shown in FIG. 9.

Figure 11:
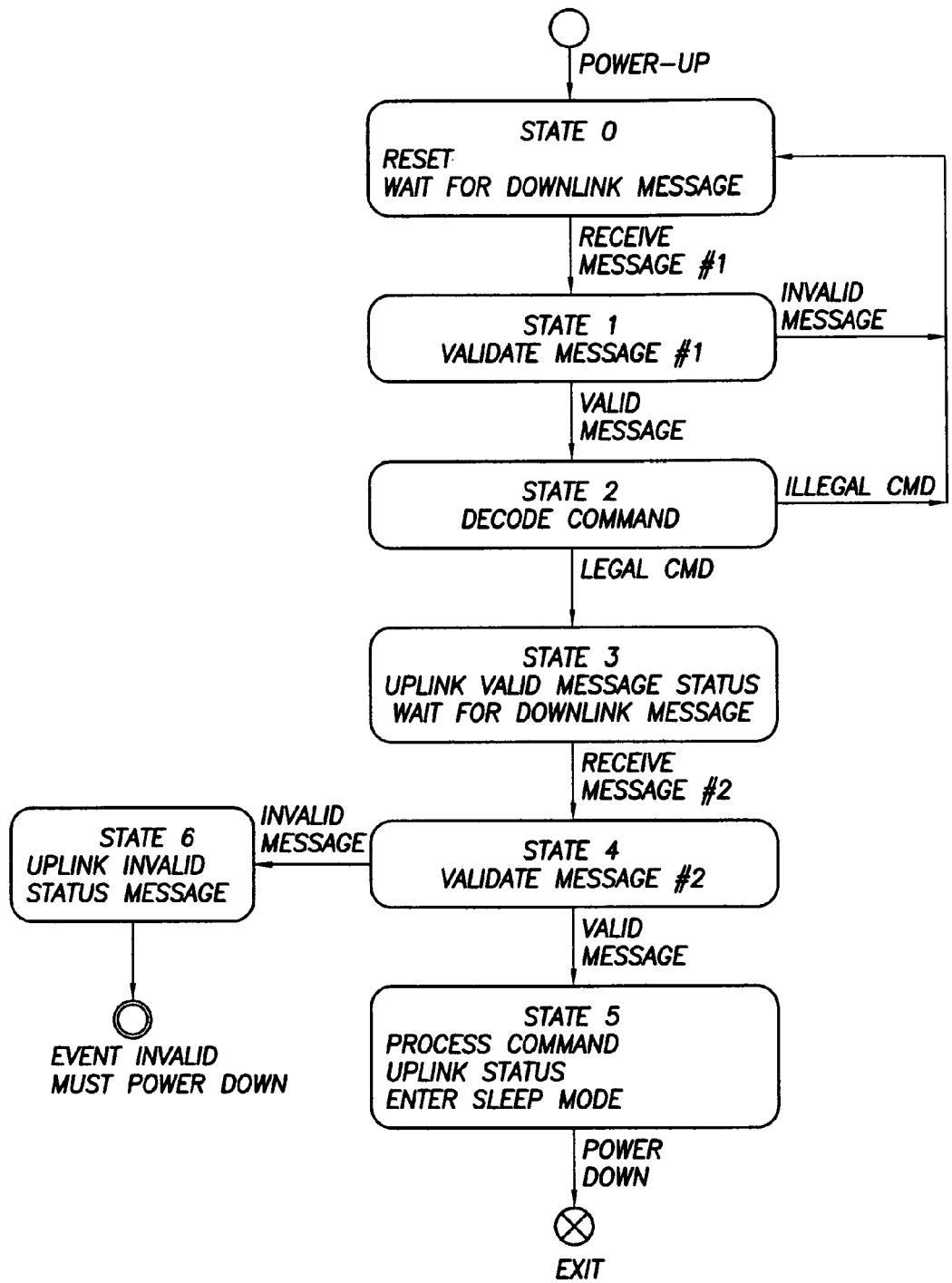
FIG. 11 is a State Diagram for a single State Machine.

FIG. 11 is a State Diagram for a single State Machine which can control either the electronics of the Tractor, shown in FIG. 6, or the Safety Sub, shown in FIG. 9.

Figure 12:
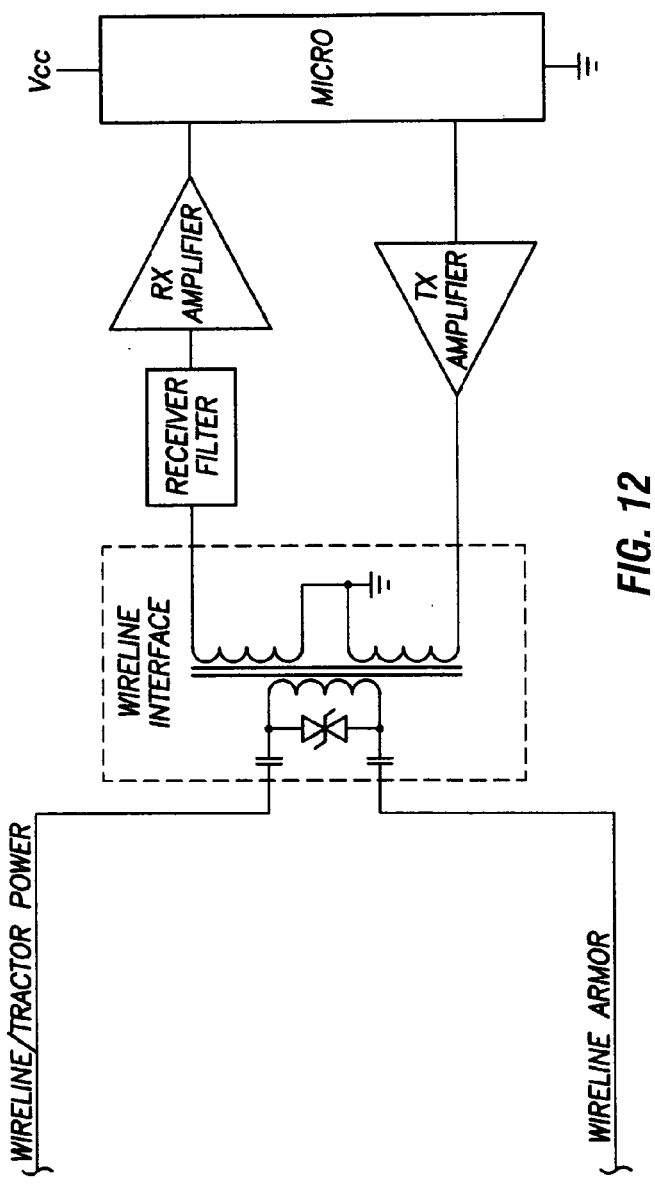
FIG. 12 is a block diagram for a Power Line Carrier Communication (PLCC) interface.

FIG. 12 is a block diagram for a Power Line Carrier Communication (PLCC) interface to the wireline. The interface could be the same at the surface and at the tractor.

Figure 13:
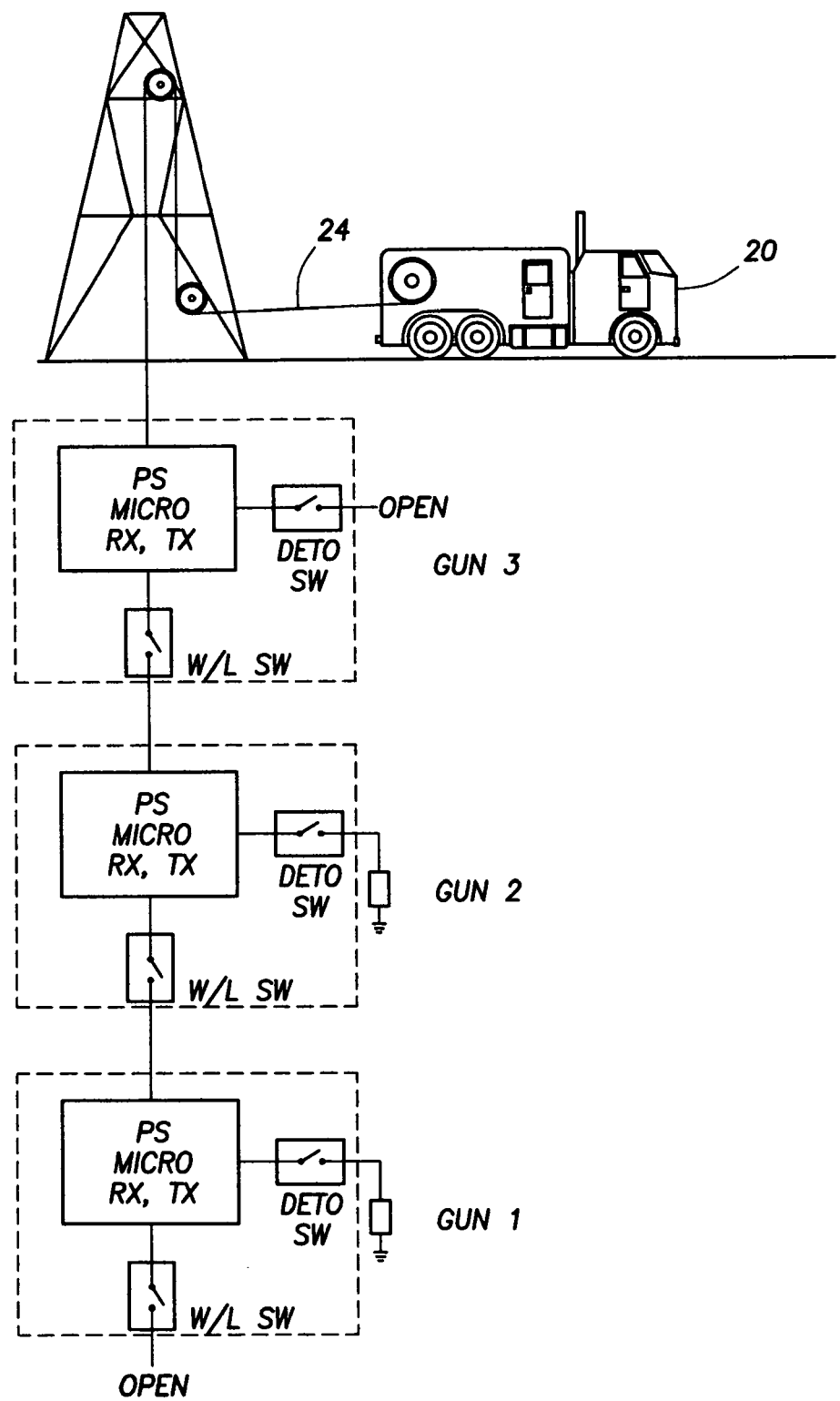
FIG. 13 shows a tool string that includes Switch Units in a gun string.

FIG. 13 shows a tool string that includes Switch Units in a gun string for firing selected guns, a wireline, a logging truck equipped with a power supply and a surface computer for controlling job events such as communication with the Switch Units, data storage, power supplies current and voltages, all following standard safety procedures.

Figure 14A:
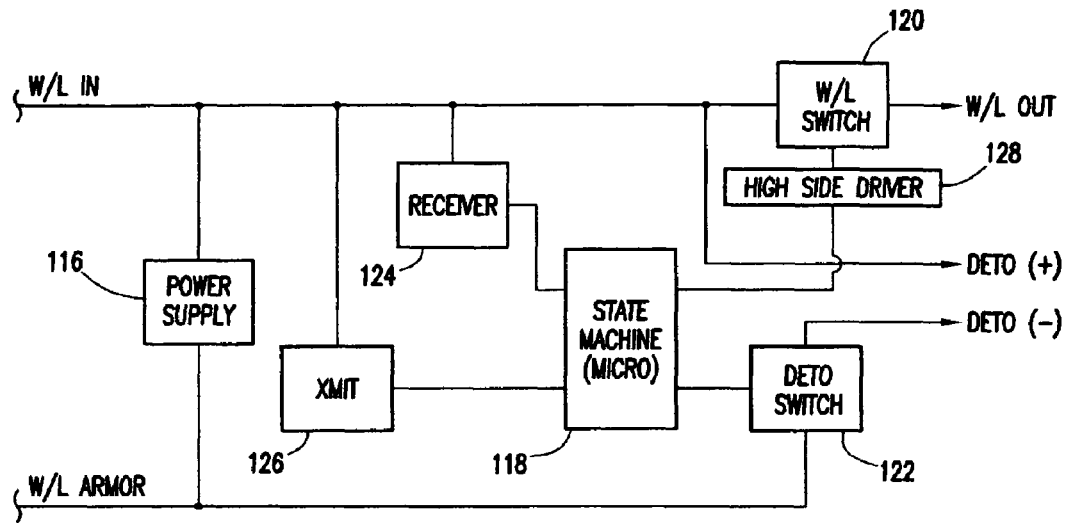
FIG. 14A is a block diagram of a perforating Switch Unit.

FIG. 14A is a block diagram of a perforating Switch Unit according to an embodiment shown in FIG. 13. The Switch Unit shown is adapted for a positive voltage on the wireline conductor with the wireline armor being at ground potential.

Figure 14B:
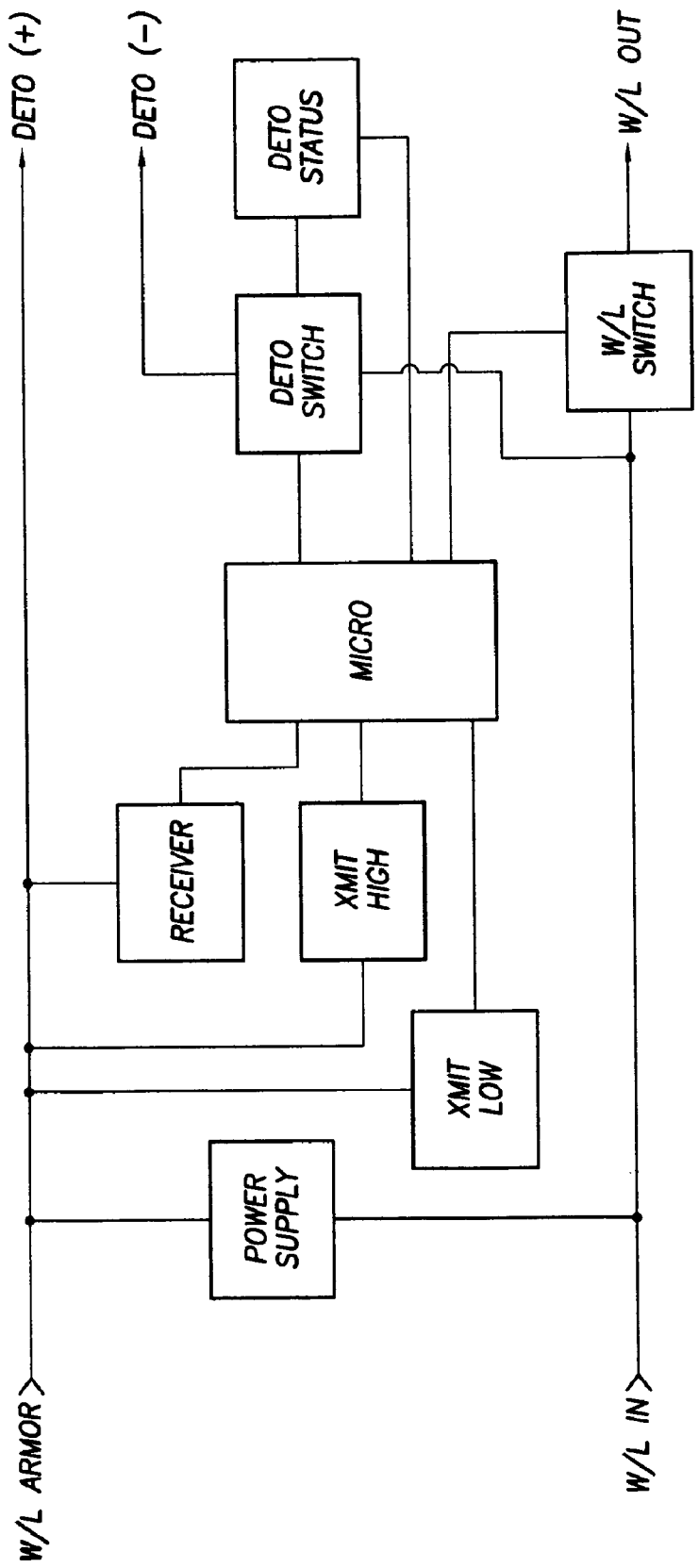
FIG. 14B is a block diagram of an alternative embodiment of a perforating Switch Unit.

FIG. 14B is a block diagram of an alternative embodiment of the perforating Switch Unit that utilizes two-level uplink communications and an internal status check of the detonator switch that is configured for perforating with negative voltage.

Figure 15:
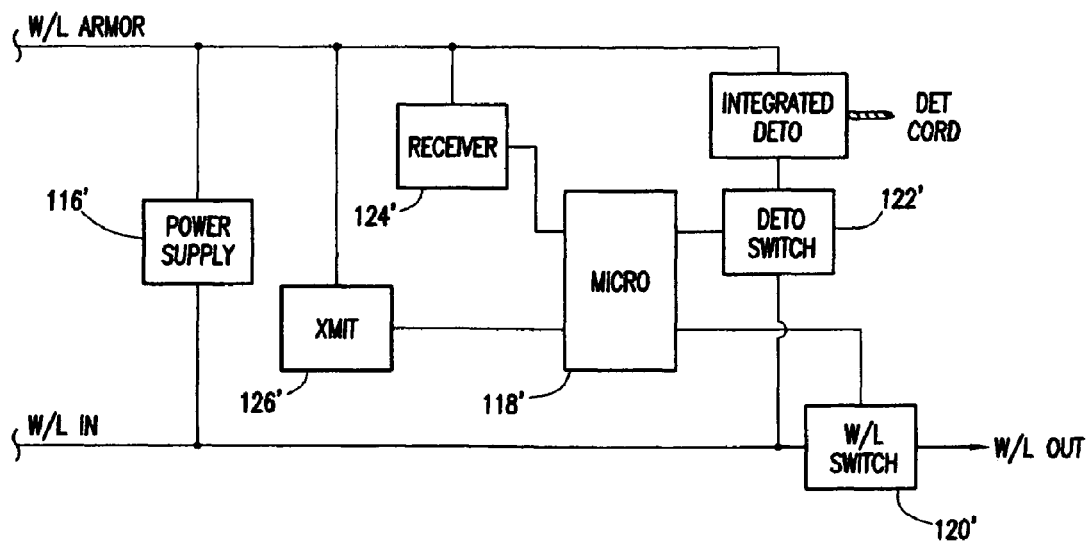
FIG. 15 is a block diagram showing a Switch Unit integrated into a detonator.

FIG. 15 is a block diagram showing a Switch Unit integrated into a detonator.

Figure 16A:
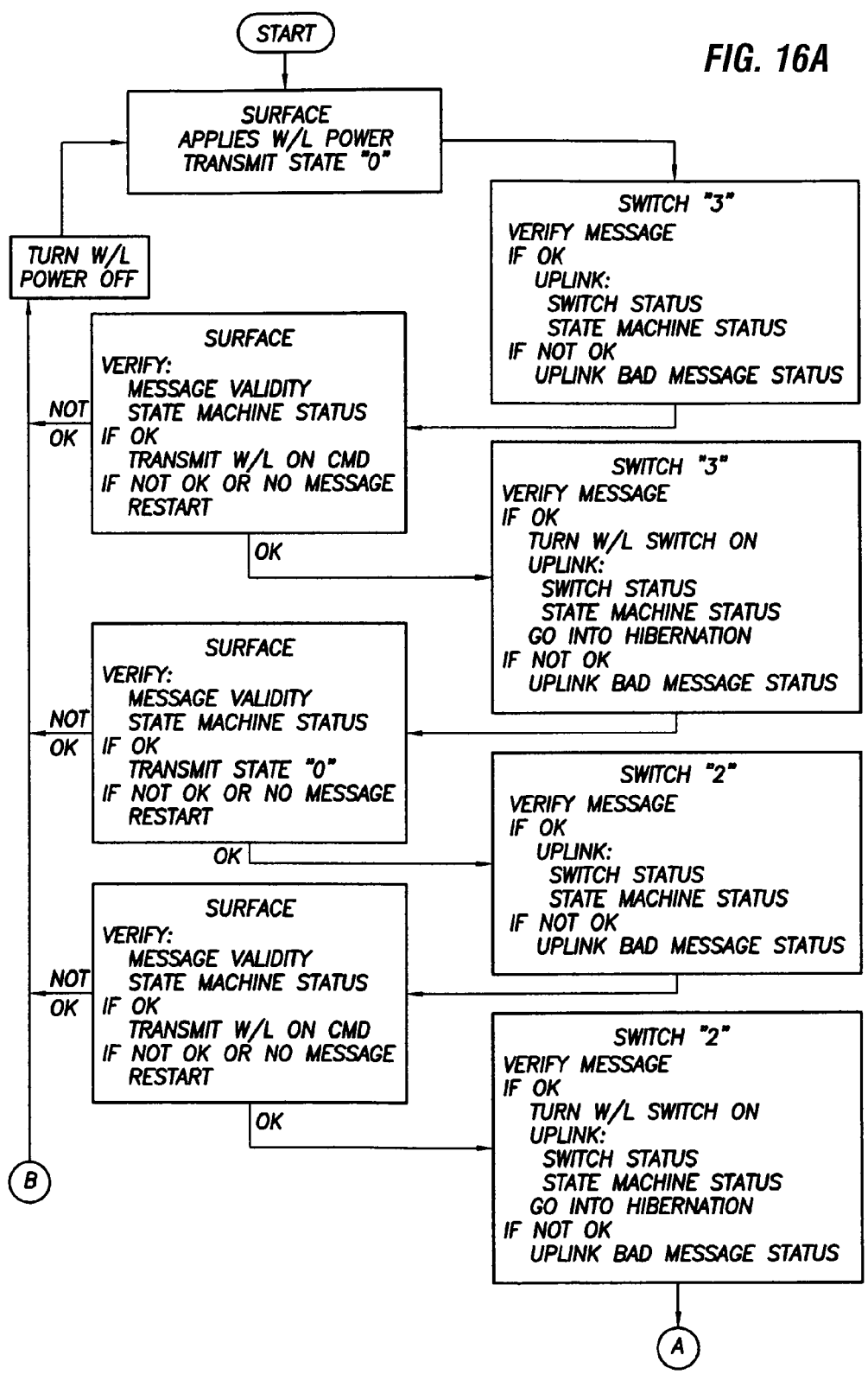
FIGS. 16A and 16B are flow charts showing a program control sequence.
Figure 16B:
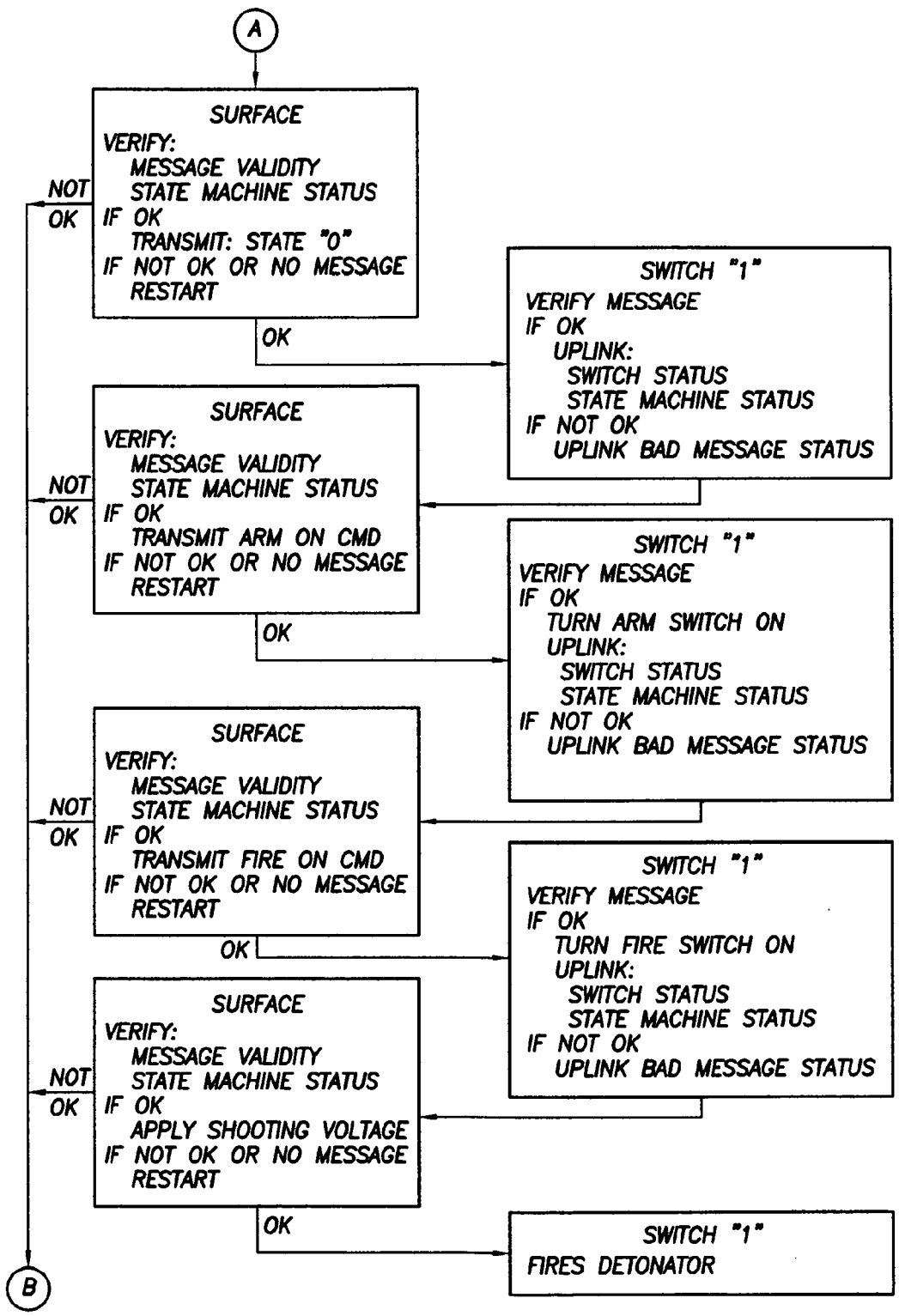

FIGS. 16A and 16B are flow charts describing the program control sequence for initializing a three-gun string and firing the bottom gun.

Figure 17:
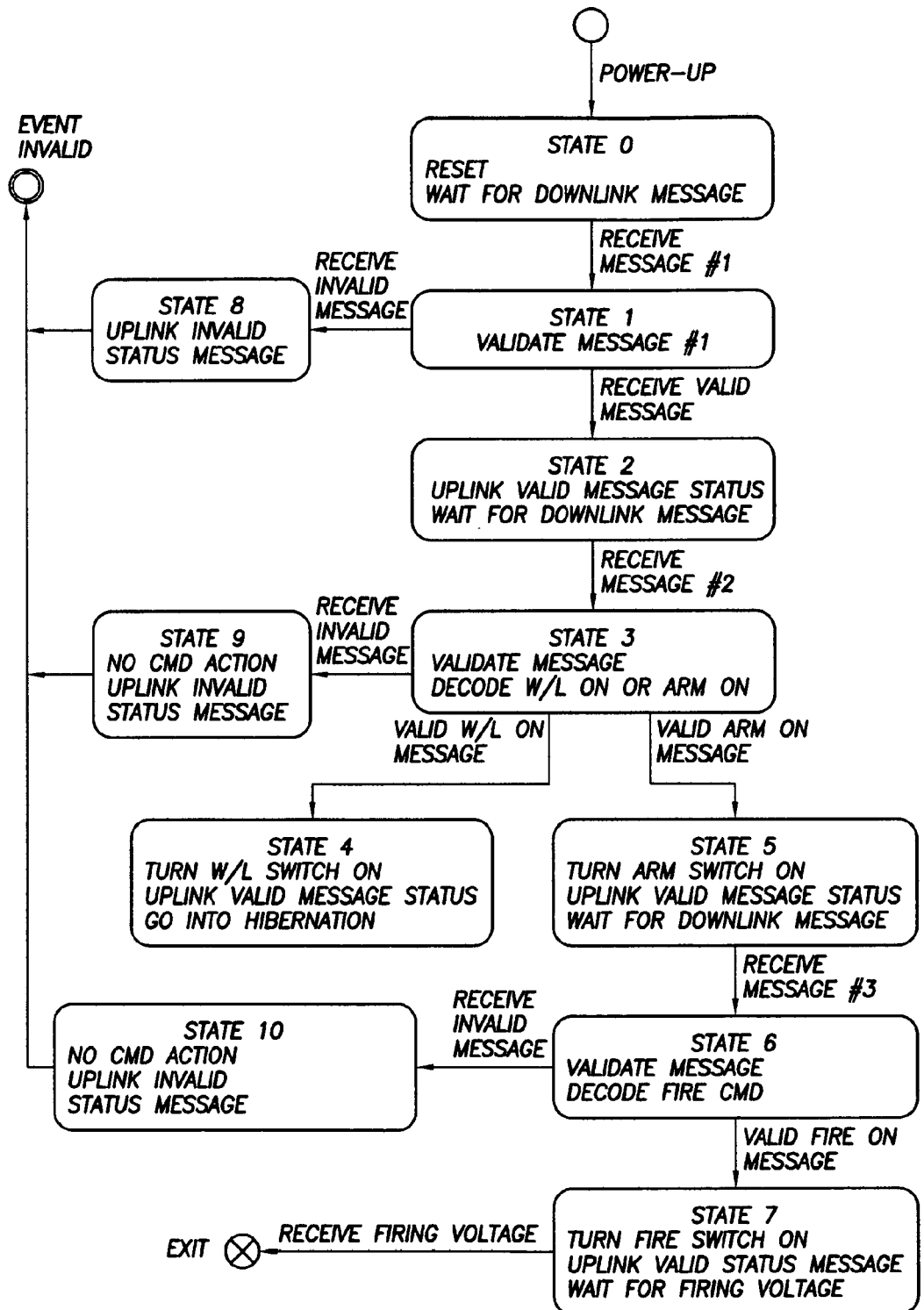
FIG. 17 is a state diagram for a state machine within a Switch Unit.

FIG. 17 is a state diagram for the state machine within a Switch Unit defining the predetermined logical flow for selectively firing detonators in a gun string.

Figure 18A:
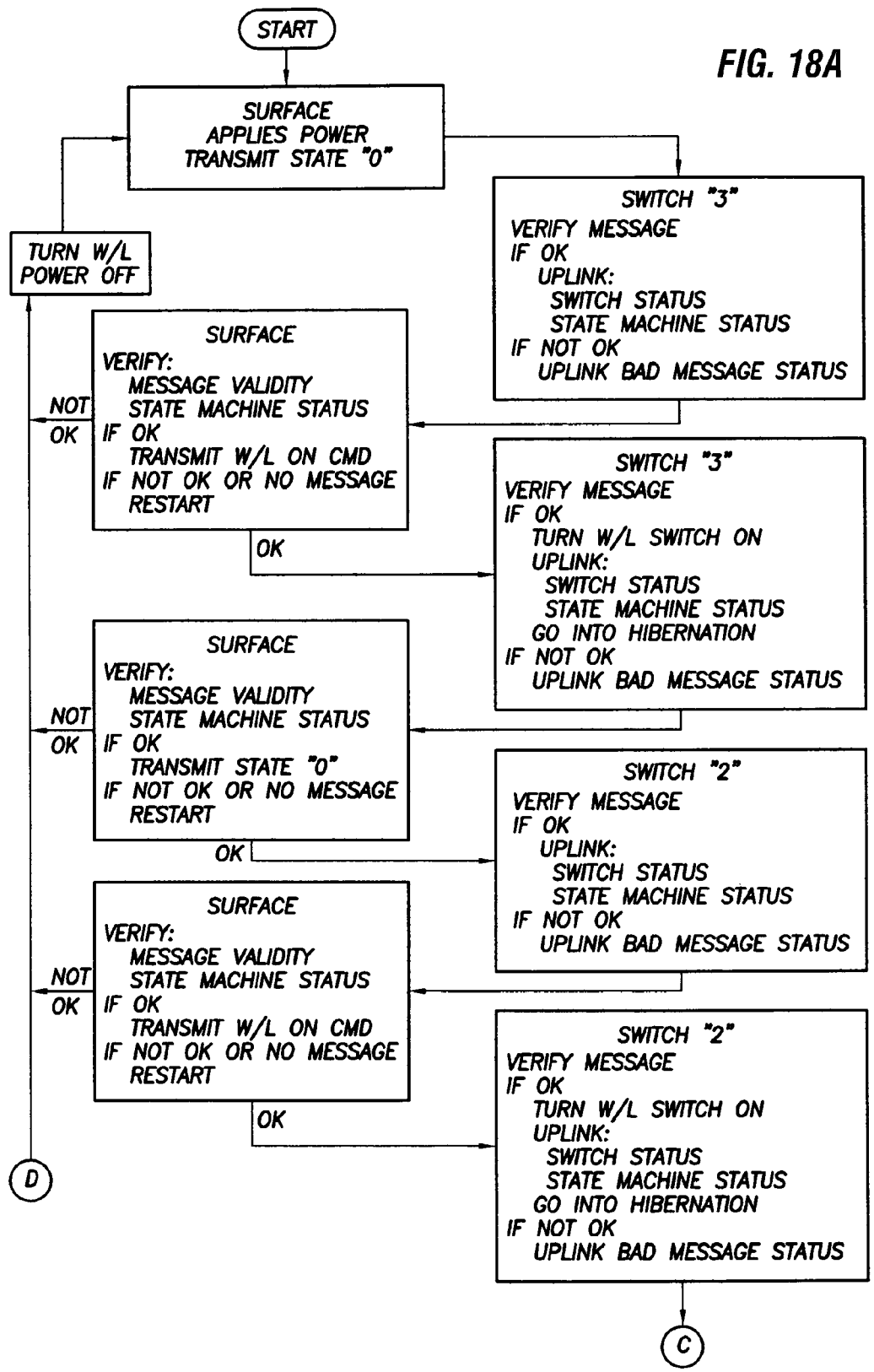
FIGS. 18A and 18B are flow charts describing a program control and sequence.
Figure 18B:
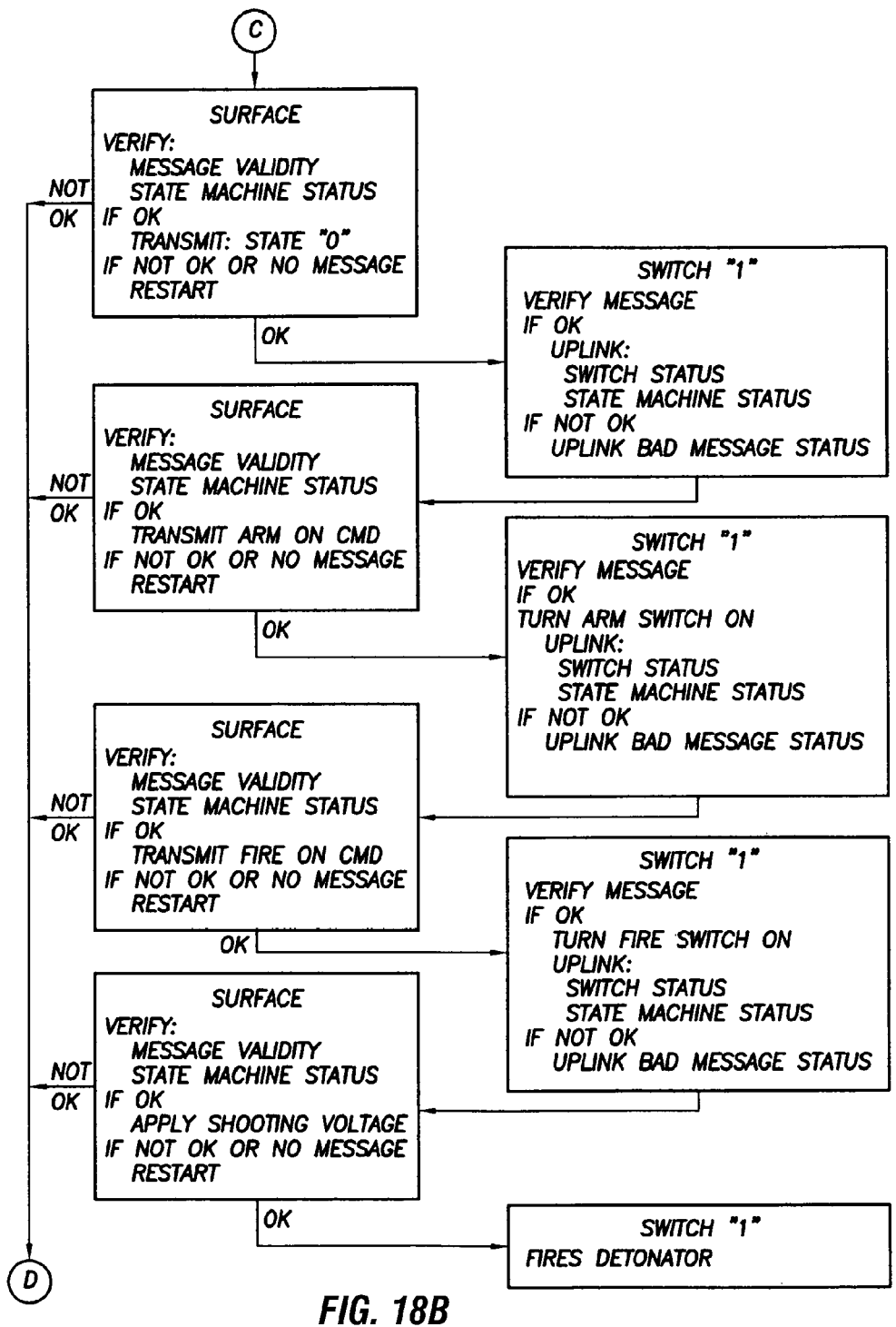

FIG. 18 is a flow chart describing the program control and sequence for initializing a two gun string and firing the bottom gun using common downlink commands for all Switch Units that solicit a unique address from each Switch Unit.

Figure 19C:
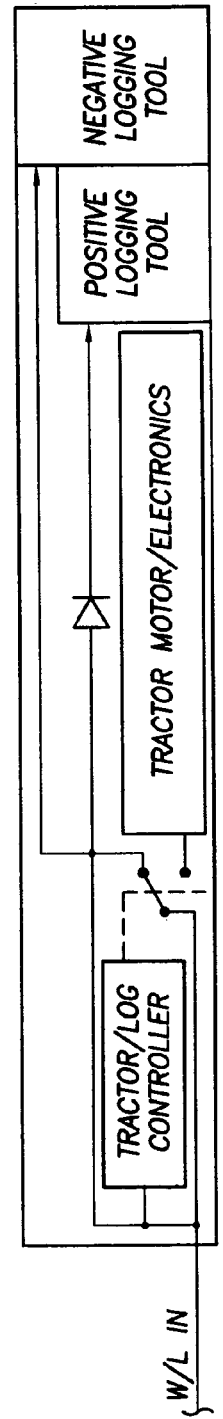
FIG. 19C shows a tool string with positive and negative logging tools.
Figure 19A:
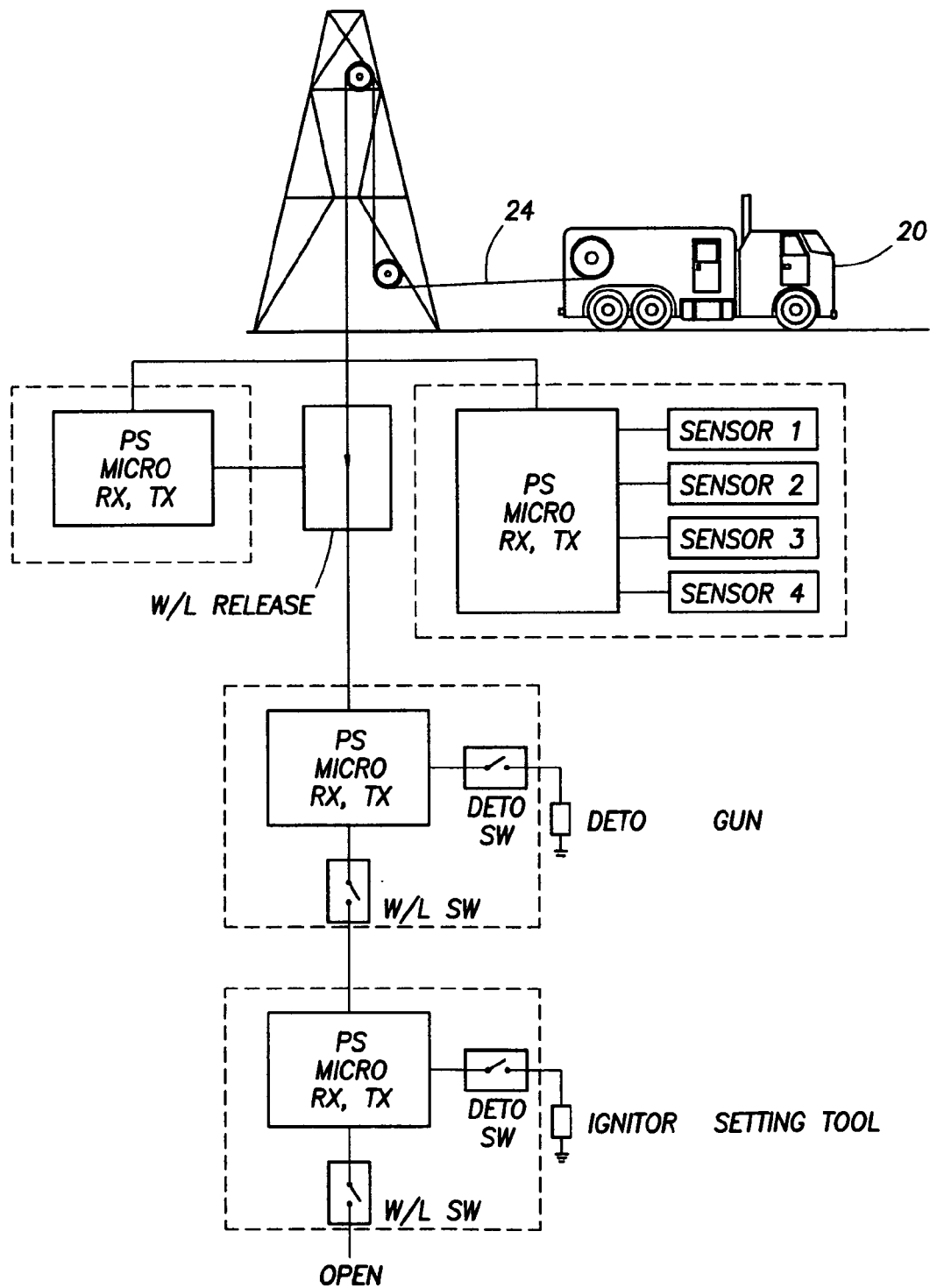
FIG. 19A is a diagram of a generalized perforating tool string.
Figure 19B:
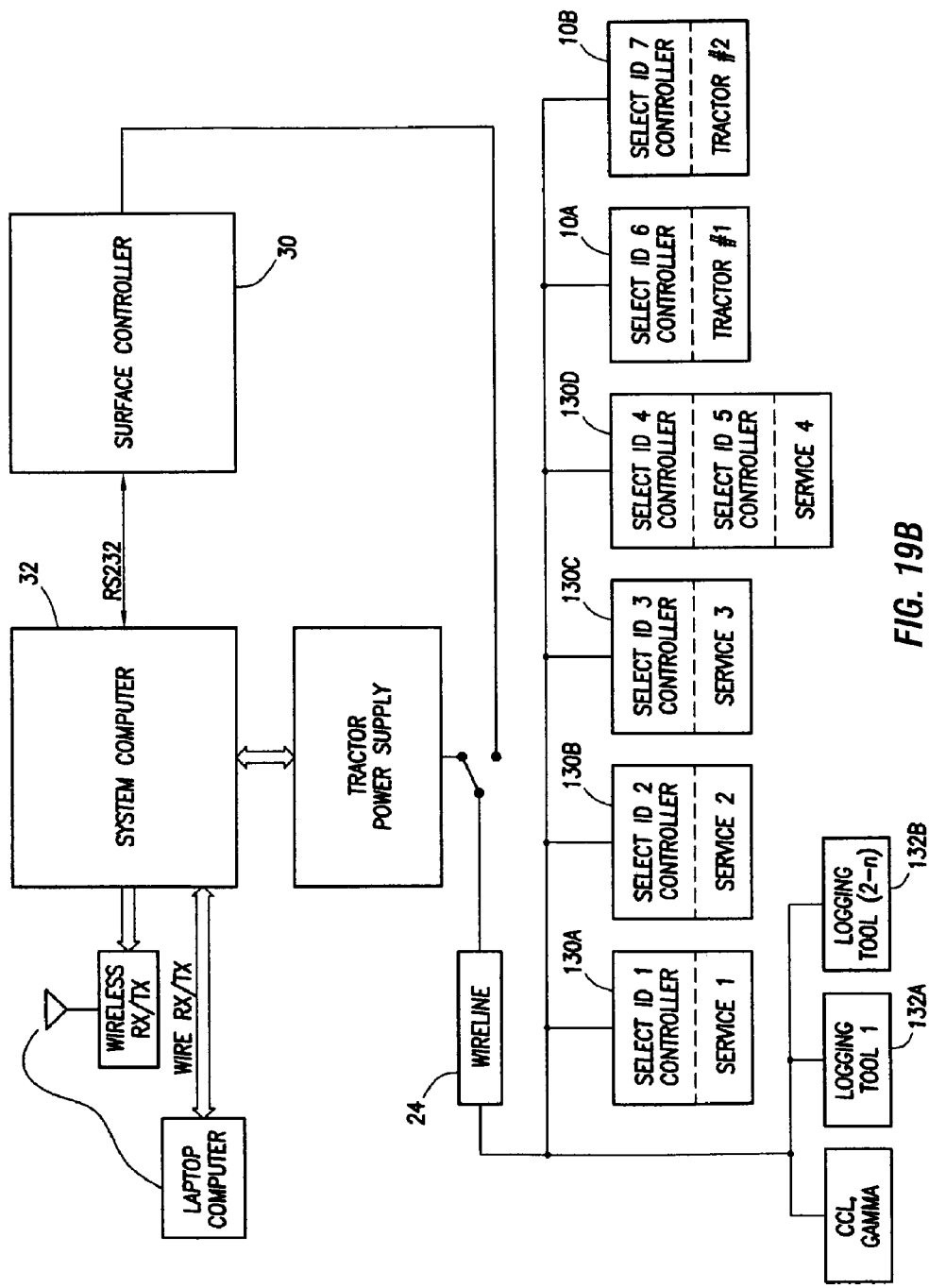
FIG. 19B shows a tool string including multiple auxiliary tractors and logging tools.

FIG. 19A is a diagram of a generalized perforating tool string including a setting tool and auxiliary devices such as sensors and cable release mechanisms illustrating both series and parallel communication paths. FIG. 19B shows a tool string including multiple auxiliary tractor and logging tools. The auxiliary and logging tools shown in FIG. 19B are powered by positive DC voltage from the surface as shown in FIG. 19C.

Figure 20:
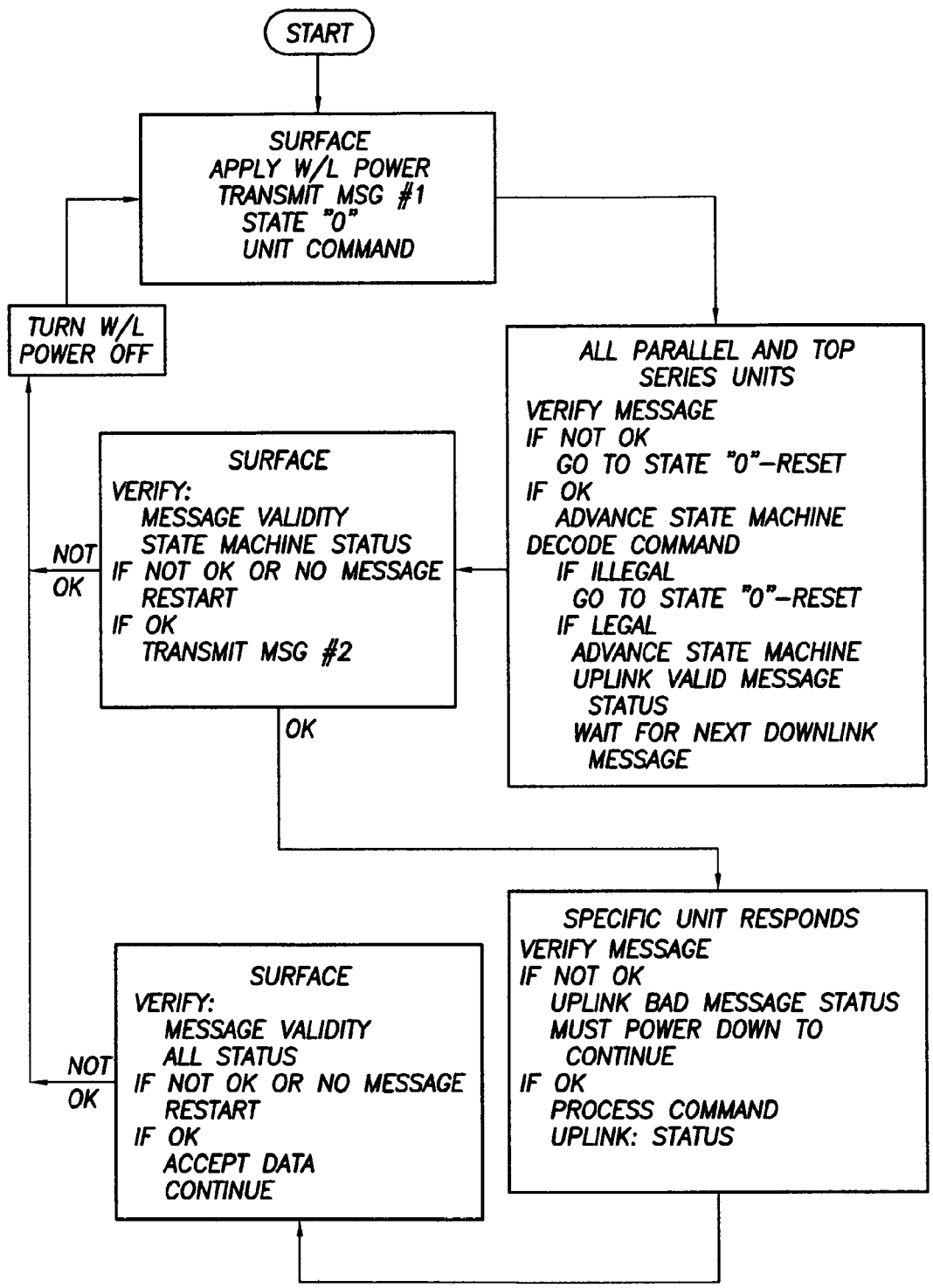
FIG. 20 is a flow chart describing a program control sequence for communicating with devices that are connected in a tool string in parallel and in series.

FIG. 20 is a flow chart describing the program control sequence for communicating with devices that are connected in a tool string in parallel and in series.

Figure 21:
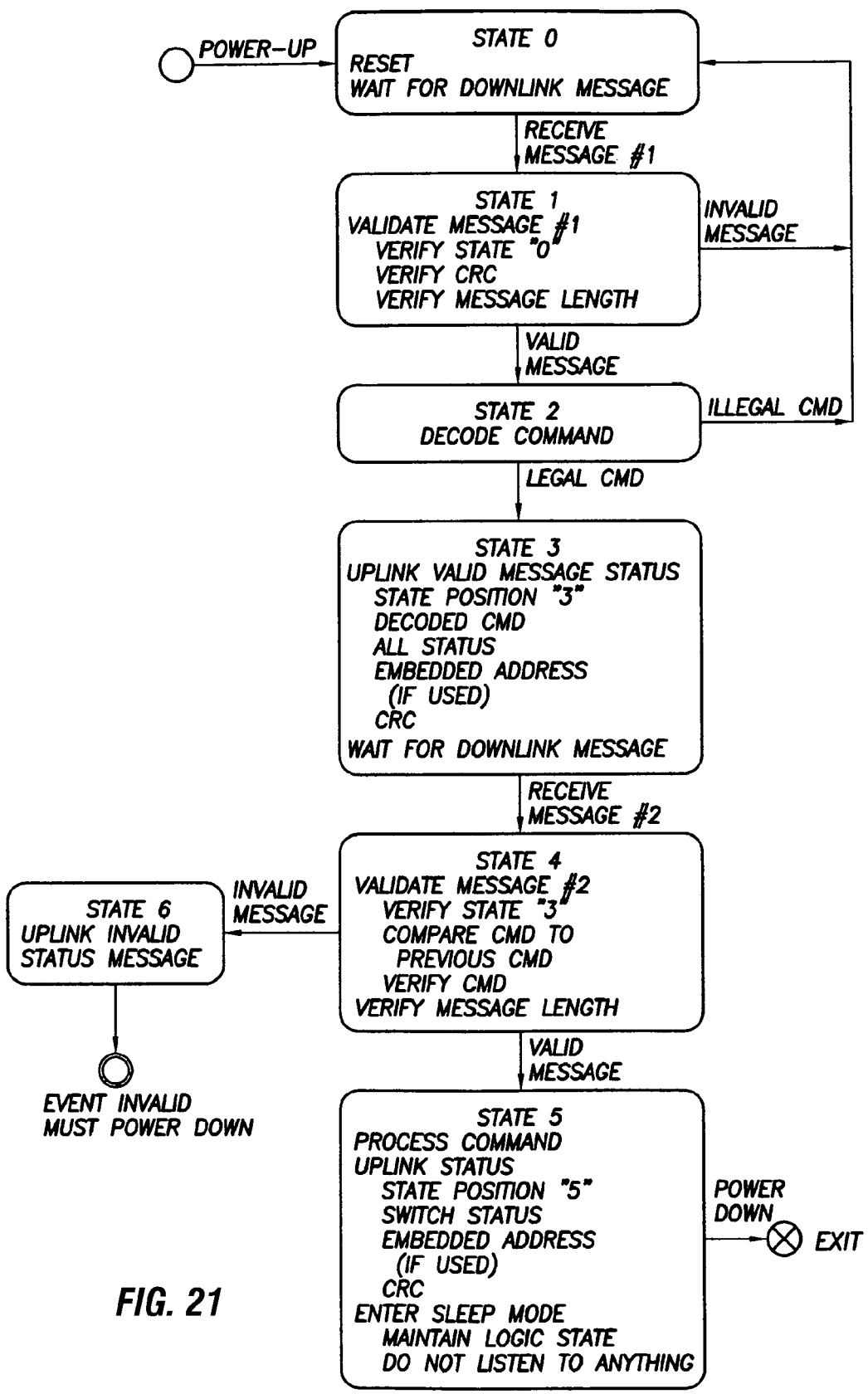
FIG. 21 is a state diagram defining a predetermined logical flow for selecting various devices that are connected in a tool string in parallel and in series.

FIG. 21 is a state diagram defining the predetermined logical flow for selecting various devices that are connected in a tool string in parallel and in series.

In more detail, and referring to FIG. 1, a tractor system is shown equipped with a tractor 10 for pushing perforating gun 18 along horizontal or nearly horizontal sections of an oil well, casing collar locator (CCL) 12 (or any correlation device for depth association), Safety Sub 14 for preventing tractor voltages from migrating to the gun system, and set of sensors for monitoring downhole events/Release Device 18 for separating the gun string from tractor 10 and perforating gun 18. Logging truck 20 typically houses power supplies and computers for performing required logging and perforating operations. A separate power supply 22 is typically used for supplying tractor power through a wireline 24 using high voltage in the range of 1000 Volts AC or DC.

Perforating power supply 26 and Tractor Power Unit 22 are not connected to the Wireline Collector 28 at the same time. Wireline Collector 28 provides a means for selecting a plurality of different signals or power for a specific operation. In all cases, only one signal and/or power source 22, 26 is connected to wireline collector 28 at a time.

The supporting peripherals used during a tractor and perforating interval are shown in FIG. 2. The Surface Controller 30 interfaces with all power supplies, commands ON/OFF sequences, and controls and delivers voltage and current to the tool string. In addition, surface computer 32 runs software for controlling and recording all communication events during a perforating job, such as position of the Switch Unit within the gun string. Computer 32 is also provided with a monitor (not shown) for displaying a visual tool string and events during a job. On many wells, the tractor operator does not have the capability of running additional services because of equipment differences or for lack of integrated support hardware. The embodiment shown illustrates a Surface Computer 32 and peripherals for supporting both perforating and tractor operation, which provides more reliable and safer operation. The more common arrangement has separate responsibility for controlling tractor and perforating operations.

Surface Controller 30 runs such events as pre-check and initialization of tractor 10, controlling tractor power supply 22 during tractor operation, running embedded software for logging during tractor operations, controlling sequences during a perforating job, communicating with and controlling other tools in a string such as drop-off joints (to disconnect in case of being stuck in the hole), safety sub functions, and operating parameters of tractor 10 such as temperature, RPM, voltage and/or current, etc. A Downlink Driver 34 typically interfaces to wireline 24 through transformer 36 to send signals down wireline 24 while powering the tools below. Uplink signals are monitored across a Signal Transformer/current-viewing-resistor (CVR) 38 and decoded for message integrity by uplink 40. Series wireline switch 42 turns power ON or OFF under computer control and also by means of using a manual removable safety key 44.

Surface Computer 32 is also equipped with a wireless or cable, or combination of wireless and cable, interface 46 to Pre-Check Controller 48. Pre-Check Controller could include a laptop, PDA or any preprogrammed device that controls predetermined events, a laptop computer being shown in FIG. 2. Pre-Check Controller 48 is connected to the tractor or gun string as shown in FIG. 3 while at the surface for pre-check procedures during which wireline safety switch/key 44 is in the OFF position with the key removed. Also due to a low power RF restriction during perforating, it may be necessary to have the 25 Surface Computer 32 equipped with an extension cable having a receiver/transmitter attached to one end to allow the wireless path to be a shorter distance and in line of sight.

As described above, Surface Controller 30 is equipped with power supplies 22, 26, one for perforating and another for tractor operations, in separate compartments for safety reasons, and only one is connected to wireline 24 at a time through a Perf/Tractor switch in wireline collector 28. The switch could also be a physical connector that allows only one connector to be installed at a time. Those skilled in the art will also recognize that computer 32 can be configured to sense whichever power supply is connected and only allow the programs to run that are associated with a particular power supply.

FIG. 3 shows various tool string configurations being tested at the surface before running in the hole. The support equipment for setup and test operations is Pre-Check Controller 48 that connects to the wireline input of the tool string, provides power and communications to the tractor input, and receives program control from a laptop through a wireless or cable connection, or from a Surface Controller as shown in FIG. 2. Radio frequency power must remain low in a perforating environment and therefore communication links are not limited to a single RF link. The communication link could lobe implemented using RF repeaters to get around steel buildings and remain in the line of sight, use RF receiver/transmitters on an extension cable, or a simple cable connection.

FIG. 3A shows typical pre-check functions for a system comprised of Tractor 10, CCL 12, Safety Sub 14, Release Sub/Sensor Unit 16, and perforating gun 18 including selective Control Units (described below). The tests performed for Tractor 10 and Safety Sub 14 include, but are not limited to, verifying communications, setting up switches to safe positions to perform tractor operations, soliciting status from the Tractor and Safety Sub switches, and functions such as verifying sensor data transmissions. Tests for the Sensors and Release Device 16 include communications and function tests. Tests for gun 18 include sending wireline ON commands to the Control Units, verifying communication to all Control Units, and correlating Control Units to specific guns and are normally performed without perforating gun 18 attached, but with the Pre-Check Controller 48 described herein, it is possible to leave perforating gun 18 attached because, in one embodiment, Surface Controller 30 limits current output in compliance with the above-described API RP67. FIG. 3B shows a pre-check for a tool string including only Tractor 10 and Safety Sub 14 equipped with other type of select fire devices that would not be tested by Pre-Check Controller 48. FIG. 3C shows a pre-check for a Release Device/Sensor Sub 16 and perforating gun string equipped with selective Control Units (FIG. 3A). The Surface Controller 30 or laptop also stores pre-check and setup data for conformation of proper operation. Using a Surface Controller located in logging truck 20 instead of a laptop, all functions, including pre-check, tractor operation, depth correlation, and perforating, are performed inside the wireline unit, reducing operational rig time.

The purpose of the pre-check is to verify proper function of all control units connected to the wireline. Tractor Control Units, Safety Sub Control Units, and Sensors and Release Devices are tested. An additional reduced current and voltage power supply is utilized for testing Switch Units within a gun string to verify that the Control Units are communicating and functioning correctly before running the perforating gun in the hole, and for safety reasons, are typically not done with the same power supply used to fire the gun downhole. As described above, the special power supply generates communication power signals with limited current output in accordance with API RP 67. Pre-Check Controller 48 commands a special internal power supply and sends power along with signals to the Control Units in the gun string through a connecting cable. Pre-Check Controller 48 receives wireless commands from a laptop; alternatively, Surface Controller 30 communicates wirelessly using communication protocols such as BlueTooth, which limits wireless output power according to established commercial standards.

FIG. 4 illustrates the Pre-Check Controller 48 and functional blocks required for conducting a tractor pre-check. Pre-Check Controller 48 is a self-contained, battery operated device that communicates on one side through wireless or cable link to a laptop or Surface Controller 30 (FIG. 2) and connects directly on the other side to the tractor input. A State Machine, implemented within a microprocessor, controls events based on commands received and is recommended for most solutions in which non-time-critical tasks are performed. In addition, the microprocessor is provided with functions such as signal conditioning, analog-to-digital inputs, digital inputs, driver outputs, watch dog timers, etc., as known in the art. As described herein, a state machine is as an algorithm that can be in one of a small number of states (a state is a condition that causes a prescribed relationship of inputs to outputs and of inputs to next states). Those skilled in the art will recognize that the state machine described herein is a Mealy machine in which outputs are a function of both present state and input (as opposed to a Moore machine in which outputs are a function only of state). The state machine as defined can also be implemented using an Application Specific Integrated Circuit (ASIC), programmable logic array (PLA), or any other logical elements conforming to a predefined algorithm.

A Downlink Driver 50 provides an interface link between the Microprocessor and Signal Transformer 52 that is capacitor coupled to the wireline. Induced signals from transformer 52 are received by the Tractor or Safety Sub (not shown in FIG. 4). An Uplink Detector 54 provides signal interfaces between the Microprocessor and a Current Viewing Resistor (CVR) 56 or Signal Transformer 52. The components of Uplink Detector sense and condition signals received from either the Tractor Unit or Safety Sub. Power for the surface controller is derived from on-board batteries 58 that can be turned ON and OFF 60. Power supplies 62 convert the battery power for proper operation of electronics and tractor communication. A current limiting element 64 in series with the power output limits the current level in compliance with API RP 67. A series wireline switch provides a means for turning the power ON or OFF under computer control.

As an example, the following describes a pre-check event for a plurality of Switch Units. FIG. 5 is a flow chart describing a first embodiment of the program control for performing the pre-check. Unlike the second embodiment described below, in this embodiment, no unique addressees) is/are used in the uplink communications. The position of each Switch Unit in the perforating string is determined by recognition of the status of the respective State Machine and the proper sequencing of messages.

The default or initial condition of the Deto Switch (see FIG. 14B) is the OFF position, thereby disallowing power to all detonators. The default condition for each W/L switch is also in the OFF position so that there is no wireline connection beyond the input of the top Switch Unit. Pre-Check Controller 48 commands a power supply to apply a power signal to the gun string through a connecting cable, energizing the State Machine in the top Switch Unit. Pre-Check Controller 48 interrogates the top Switch Unit and sends a State (0) command (see FIG. 17 for a state machine diagram). After receiving the first message, the top Switch Unit validates the message. Upon receiving a valid message, the State Machine in the top Switch Unit advances and uplinks a message containing switch status, state machine status, and a security check word. Upon receiving an invalid message, the Switch Unit uplinks an invalid message response. Upon receiving the first uplink message, the surface computer validates the message, verifies the state machine status, and downlinks a W/L ON command. If the Switch Unit sent an error message or the uplink message was invalid, power to the gun string is removed and the process restarted. After receiving the second downlink message, the top Switch Unit validates the message, and if valid, the Switch Unit advances the State Machine of the top Switch Unit, turns the W/L Switch ON, and uplinks a message containing switch status, state machine status and a security check word. The top Switch Unit then goes into hibernation. This process is repeated for each and every Switch Unit in the string. By recognizing the change in state of each Switch Unit as it communicates, the surface computer uniquely identifies each Switch Unit in the string.

One variation on this sequence is for the top Switch Unit to send an uplink message upon power up containing a State (0) status, State Machine status, and security check word. The surface computer records and validates the message and returns a command advancing the State Machine to (1), turning W/L Switch ON. The top Switch Unit then sends a second uplink message containing a State (1) status. Applying power to the next Switch Unit wakes it up and triggers an uplink message of its State (0) status. The uplink is delayed to allow the second uplink message to be received first at the surface. The second Switch Unit is then commanded from the surface to advance to State (1), and so forth. By recognizing the change in state of each Switch Unit as it communicates, the surface computer uniquely identifies each Switch Unit in the string.

A tractor has two basic operation modes, Tractor Mode or Logging Mode. In Tractor Mode, high power is delivered to the motor for pushing tools along a section of a well. In Logging Mode, the tractor provides only a through-wire connection to tools connected below the tractor. FIG. 6 illustrates a control function for directing wireline voltages to either the tractor motor/Tractor Mode, or directing the wireline to the tractor output/Logging Mode. After the tractor has pushed the tool string into location, redirection to Logging Mode is required. The wireline must first be disconnected from the tractor motor and then reconnected to the tractor output.

The following disclosure describes a control system within the tractor that safely disconnects the wireline from the tractor motor and connects it to the output of the tractor. The system only allows connection to the Logging Mode when certain criteria are met and verified, and is redundant so that a single point failure cannot cause unwanted voltage below the tractor. Referring to FIG. 6, the system comprises two similar circuits 66 connected in series. First circuit 66A controls a set of switches 68A connecting the wireline to either the tractor motor or switches 68B in second circuit 66B. Second circuit 66B controls a set of switches 68B connecting the output of the tractor either to ground or switches 68A. Each set of single-pole, double-throw (SPDT/form C) switches is ganged together with another like pair of contacts in order to obtain status of the combined pair. The switches 68A, 68B shown in FIG. 6 are generic and can be one or more different types such as latching relays, latching solenoid piston switches, bi-directional solid state switches in the form of N and P channel Field Effect Transistors (PET), insulated gate bipolar transistor (IGBT) with high side drivers, etc. The Switch Control 70A, 70B between respective microprocessors 72A, 72B and switches 68A, 68B is designed for the appropriate action as known to those skilled in the art. Switches 68A, 68B are controlled from the surface by sending signals to the control units that are decoded by onboard microprocessor 72A, 72B, processed by the respective state machine, and used to control switch position. In addition, switch status is returned to the surface, validating switch action. Each control unit is also provided with an onboard power supply 74A, 74B and transmit 76A, 76B and receive 78A, 78B circuits for communication.

For safe perforating while using a tractor, it is necessary to avoid single point allures that cause unwanted voltages on the tractor output. FIG. 6 shows the combinations of positions for the Motor switch and Log switch. Each switch has two positions, yielding a total of four combinations, shown in FIGS. 7A, B, C, and D. In all cases, wireline voltage must pass through two separate switches controlled by separate circuits before reaching the output, satisfying the single point failure requirement.

It is sometimes important to solicit operating parameters associated with tractor operations including, but are not limited to, temperature, head voltage and current delivered to the tractor unit, and tractor motor RPM. Operating parameters are retrieved in real time by surface computer 32 using power line carrier communications (PLCC) that provide for both downlink and uplink communication signals to be sent over a wireline while the tractor is powered. On the transmit side, signals are injected onto the wireline and ride on top the power. On the receiver side, signals are extracted using band pass filter techniques, allowing commands to be sent to the tractor control electronics as well as retrieving status from downhole events. FIG. 8 depicts a separate microcontroller using the same protocol as in FIGS. 6 and 9. Input voltage 80 into tractor motor 82 is sensed 30 using a resistor voltage divider for DC tractors or a step-down transformer followed by a bridge rectifier for an AC tractor. These status signals are conditioned, scaled, and sent to an analog-to-digital input of microprocessor 84. Monitoring current delivered to a tractor motor can reveal whether a motor has lost traction, is in a lock rotor condition, or is being over- or under-loaded relative to well bore temperature. Tractor current is monitored by sensing voltage across a current-viewing-resistor (CVR) 86 using an operational amplifier 88 having sufficient gain for reading by an analog-to-digital input. The scale factors used depend on load ranges, analog to digital bits, and required accuracy.

A plurality of temperature sensors, shown schematically at reference numeral 90, are used to monitor downhole temperature, motor winding temperature, boring bit temperature, or any other tractor functions as known in the art. A variety of sensors may be used, including a resistor-thermal-device (RTD) associated with a reference voltage, thermocouples, junction voltages of semiconductors, and voltage-to-frequency converter associated with an RTD. In all cases, a calibration and scale factor is part of an overall design as known to persons practicing the art. Sensor outputs are represented by either a voltage or frequency and monitored by either analog-to-digital input or time domain counter and converted to temperature. The revolutions-per-minute (RPM) of various motors within a tractor is important for milling operations as well as pushing payloads. The RPM sensor 91 accumulates pulses generated by motor shaft rotation and counted over a selected time for RPM derivation. Other sensors may be used including, but not limited to, magnetic field coupling, optical, infrared, switch contacts, and brush encoders.

For safe perforating with a tractor system Safety Sub 14 (FIG. 1) is placed between the output from tractor 10 and the input to perforating gun 18. Safety Sub 14 must not have any single point failures and is typically certified by an outside authority. Safety Sub 14 has two modes of operation, Safe Mode (during tractor operations) and PerfMode (only when perforating). Switching between modes is done only after tractor power has been disconnected at the surface.

FIG. 9A illustrates a system with no single point failures, accomplished with two circuits 92A, 92B connected in series for redundancy. When the first (bottom) circuit 92A is in Safe Mode, switch K1 disconnects from the wireline and connects the entire second (top) circuit to ground. The Safety Sub output is also grounded either through switch K1 or switch K2. If the first (bottom) circuit 92A is in Perf Mode, switch K1 connects the second (top) circuit 92B to the wireline. The output is again protected by the second switch K2. For wireline voltages to pass to the Safe Sub output, two sets of switches, K1 and K2, must be commanded and set to Perf Mode. The second circuit 92B provides control to a set of switches K2. Switch K2 connects the output of Safety Sub 14 to either ground or the center contact of switch K1. Whenever switch K2 is connected to ground, Safety Sub 14 also provides a ground to the perforating gun input. Whenever switch K2 is connected to the center contact of switch K1, the Safety Sub output may be connected to ground or the wireline input. The logic that follows shows that both control circuits must fail in PerfMode before Safety Sub 14 can pass unwanted voltage.

Each set 94A, 94B of single-pole-double-throw (SPDT/form C) switches are ganged together with another like pair of contacts to obtain true status of the existing pair. The switches shown are generic and can be one or more of many different types such as latching relays, latching solenoid piston switches, bi-directional solid state switches in the form of N and P channel FETs, and IGBT with high side drivers, all as known in the art. The switch control 96A, 96B between microprocessor 98A, 98B and the switch element is designed for appropriate action as known in the art. Switches within Safety Sub 14 are controlled from the surface by sending signals to the Control Units that are decoded by onboard microprocessor 98A, 98B and used to control the position of switches 94A, 94B. In addition, switch status is returned to the surface, thereby validating switching action. Each control unit also has an onboard power supply 100A, 100B along with circuits that transmit 102A, 102B and receive 104A, 104B communication signals.

The motorized piston switch shown in FIG. 9B has the advantage of a construction that is easily adapted to round tubing geometry and provides a rugged and reliable switch for the high shock perforating environment. In addition, the position of the contact makeup, either open or closed, remains in position after removal of all power. The latching feature of the piston switch allows the tractor operator to set the switch to a desired position and then turn wireline operations over to a contractor for logging or perforating services. The piston switch is comprised of the following functions. A microcontroller 106 controls the signal for turning motor 108 ON and OFF and selects the direction of the motor rotation (clockwise- or counter-clockwise). Additionally, microcontroller 106 monitors the position of the Piston Switch to determine if the contacts are in either the SAFE or PERF position. An H-Bridge 110 receives commands from microcontroller 106 and changes polarity to DC motor 108, thereby allowing the motor to turn in either direction. Motor 108 is connected to a planetary gear reduction box equipped with a threaded screw section. The threaded screw section, having an embedded set of contacts, shuttles back and forth to make up to mating contacts. This action forms either a single pole single throw (Wireline to Gun contact) or single pole double throw (as Perf and Safe Status to the micro). The switch shown on top of FIG. 9B is in an open position (SAFE) and the switch on the bottom is in a closed position (PERF).

A wireline can short to ground when the perforating gun fires and communication can be interrupted, particularly with a form-C switch. Without communication, the switches in both Tractor 10 and Safety Sub 14 cannot be changed. FIG. 9A shows two methods for resolving a shorted wireline situation. The first is to place the primary of a transformer 112 in series with the output of Safety Sub 14. The output side of transformer 112 is also shunted to ground through a small capacitor. The value of the capacitor is chosen such that it only provides a shunt to ground at frequencies much higher than communication frequencies and therefore does not interfere with normal communications and perforating operations. A W/L Disconnect Control 114 is connected to the secondary of transformer 112. W/L Disconnect Control 114 encompasses a bridge rectifier and is filtered in order to produce DC voltage and a path to route the developed voltage to release the switch from the Safety Sub output. When a shorted wireline exists on the output of Safety Sub 14, a high frequency signal is sent from the surface through the transformer and capacitor. The result is that a voltage is developed on the secondary of transformer to actuate the Safety Sub switch K2 and clear the short. A second method (not shown) of preventing a short on the output of Safety Sub 14 is to place a diode in series with the output of the Safety Sub. Those skilled in the art will recognize that the diode could be a normal diode of chosen polarity, a single Zener diode of chosen polarity, or a back-to-back Zener having a predetermined breakdown voltage in both directions. Using a normal diode as an example, perforating is done in one polarity and communication in the opposite polarity. With a simple diode, only one polarity is shorted to ground, thereby allowing communication using the opposite polarity.

Alternatively, a Zener provides the same results as a normal diode along with a selected breakdown voltage in one polarity. With a properly selected Zener voltage, communication continues at signal levels below breakdown voltage with the advantage that shooting of perforating gun 18 can be done selectively in both polarities. The voltage delivered to gun 18 in one polarity is less by the Zener breakdown value and generally has no effect on perforating. A back-to-back Zener has all the features of a single Zener diode except that standoff voltage is the same for both polarities. The voltage delivered to gun 18 is less by the Zener breakdown value for both polarities of shooting voltage. Again, no detrimental effect is seen during selective perforating. Voltage blocks between Safety Sub 14 and gun 18 are also accomplished using a Triac (not shown) that triggers at a predetermined voltage above the operating voltages of Safety Sub 14 that is either positive or negative. The Triac blocks all voltages until triggered, and after being triggered, only a small voltage drop is seen across the device, which is desirable for Shooting selectively (plus and minus polarities).

Another method for creating a voltage block between Safety Sub 14 and gun 18 is implemented with a set of FET transistors. One P-Channel FET controls or switches the high side and the other N-Channel FET controls or switches the low side, allowing both polarities to pass for selective shooting. Again, predetermined switch voltages (turn ON) can be implemented using zeners, diacs, thyristors, etc.

FIG. 9C shows a negative voltage blocker between the top of perforating gun 18 and Tractor 10 that prevents negative wireline voltages from being seen by the Detonator when communicating to tools in the string above the perforating gun, provides a negative disconnect between the top of a shorted gun and other communication units, provides a shunt across the Detonator for negative wireline voltages to reduce current across the Deto due to Triac leakages at elevated temperature, and allows unrestricted positive voltages to pass (except for the two positive shoot diodes) described below.

Like the method for resolving a shorted wireline and/or losing communication with the guns in the string shown in FIG. 9B, the negative voltage blocker shown in FIG. 9C is comprised of first and second circuits 134A, 134B providing redundancy in the event of parts failures, each circuit 134A, 134B including a respective Triac switch 136A, 136B in series such that both must fail shorted to render the voltage blocker inoperative. Each circuit 134A, 134B includes a diode protector 138A, 138B that prevents positive wireline voltages from damaging the parts of the circuits that are sensitive to polarity and a voltage standoff/Zener 140A, 140B that prevents the respective Triac switches 136A, 136B from turning ON or the Shunt in each circuit 134A, 134B from turning OFF before the Zener conducts. The Triac triggers 142A, 142B in each of circuits 134A, 134B turn ON after reaching the stand-off voltage and provide a current path from the gate of the respective Triac switches 136A, 136B to ground and force the Triacs 136A, 136B to turn ON, providing high power, high voltage switches for controlling the negative wireline voltage to Deto. Disconnect controls 144A, 144B turn ON after reaching the stand-off voltage and provide a ground path for turning the respective load disconnects 146A, 146B within the load controls OFF. Load disconnects 146A, 146B are normally ON to switch the shunt to OFF after reaching the pre-determined stand-off voltage. Deto shunts 148A, 148B provide parallel current paths across the Deto until negative wireline voltage reaches the pre-determined stand-off voltage. The shunts from each of circuits 134A, 134B are connected across the Deto in parallel. Diodes 150A, 150B in each circuit 134A, 134B provide a path from the wireline to Deto, allowing unrestricted positive voltages to pass for shooting with positive voltages.

One embodiment of a safety sub constructed in accordance with the present invention is shown as a block diagram in FIG. 9D-1. The above-described control unit is incorporated into the safety sub shown in FIG. 9D-1 on the left side of the figure.

FIG. 10 illustrates a method for communicating with a microprocessor/state machine without sending a downlink address for an identifier. Typically an identifying address is embedded in the host message when two or more remote devices are on a common buss to prevent coincident response signals from multiple remote responding devices. In accordance with the present invention, each state machine/remote device has a plurality of its own set of legal commands. Upon receiving a message, the controller decodes the embedded command. Only if the command is legal is the receiving controller allowed to generate an uplink message, thereby preventing buss contention or collision of data when two or more remote units are on a buss or party line connection. In addition, before uplink transmission can occur, the logical position of the state machine is compared and must be in sync with the expected state position transmitted by the host. This comparison further discriminates which messages are legal and which controllers are allowed to return an uplink message. In another embodiment, a unique identifier is attached to each uplink or returned message to further distinguish or identify one control unit from another. In another embodiment, unique identifiers are attached to both uplink and downlink messages. These methods apply to each controller within the Tractor Electronics (FIG. 6) and to each control unit within the Safety Sub (FIGS. 9A and 9B).

Referring to FIG. 10, the Surface Unit first applies power to the wireline, causing all control units on the communication buss to initiate a power-up reset and enter state "0" waiting for a downlink message. The Surface Unit then sends a downlink message containing a plurality of commands specific to only one controller along with a state "0" status. Every downhole controller receives and verifies the message for errors. If an error is detected, the downhole controller reverts to state "0" with no further action. If the message is error free, the state machine advances and the command bits within the message are decoded. If the command is illegal, the downhole device reverts to state "0." If the command is legal for a particular device, the state machine again advances, uplinks a message, and waits for a second response. The Surface Unit receives and validates the first uplink message, and if in error, the surface controller goes into a restart mode by turning power OFF and then back ON. If the message is error free, the Surface Controller transmits a second message containing the same control command and the state machine expected position. Again, all remote control units receive the second message but only the one controller matching the downlink state position that receives a legal command is allowed to advance and process the message. If the message is verified and an error exists, a bad message status is returned and the downhole device must be powered down to continue. If the message is verified free of errors, the command is processed and a return (uplink) confirmation message is transmitted. The Surface Unit receives and validates the message. If the message contains errors, the Surface Controller restarts the entire process. If the message is error free, the Surface Controller accepts the data and continues to the next downhole controller.

FIG. 11 illustrates a predefined sequence of events for controlling each downhole device (such as the Tractor Control Unit or a Safety Sub) containing one or more microprocessors or state machines. Upon power-up, the state machine enters state "0" and waits for a downlink message. Upon receiving a message from the surface, the state machine advances to state "1." While in state "1," the message is validated for proper state position, cyclic-redundancy-check, and message length. An invalid message causes the state machine to revert to state "0." If a valid message is decoded, the state machine advances to state "2" and the command bits are decoded. If an illegal command is decoded for that particular controller, the state machine again reverts to state "0." If a legal command is decoded, the device returns a message containing state "3," the decoded command, switch status, embedded address (if used) and cyclic-redundancy-check, and device waits for a second downlink message. Upon receiving a second downlink message, the state machine advances to state "4." While in state "4," the downhole controller verifies receiving the proper state position from the surface controller, again compares the command bits with the previous command bits, cyclic-redundancy-check, and message length. If the message is invalid in any way, the state machine advances to state "6" and the downhole controller transmits an uplink message confirming an invalid message. At this point, the controller must be powered down in order to restart. If the message is valid, the state machine advances to state "5" and processes the command. For the last event, the downhole controller transmits an uplink message including state "5" position, switch status, embedded address (if used), and cyclic-redundancy-check. The microprocessor/state machine now enters a sleep mode while maintaining its present logic state and will not listen to any more messages until a complete restart.

The block diagram in FIG. 12 is but one example for interfacing a Power Line Carrier Communication (PLCC) scheme onto a wireline and could be the same at the Surface Controller in FIG. 2 and the Tractor Controller FIG. 6. For those skilled in the art, there are many ways to interface a power cable for PLCC operations. A capacitive coupled transformer taps across the wireline (power line), providing a route for injecting high frequency communication signals onto the wireline and for extracting signals from the wireline during power operations. The receiver section also includes a Receiver Filter and Amplifier for conditioning the signal for use by the microprocessor. The transmitter section also includes an amplifier of sufficient power for signal generation. Communicate using half-duplex, master/slave party line, and complies to interrogation/response only (no unsolicited uplinks). Signals:

a. Downlink—FSK (mark/space frequencies TBD)
b. Uplink—Current Loop, modified NRZ or Manchester Baud Rate—300 Baud or higher (for example).

FIG. 13 shows a perforating gun system with three guns attached to wireline 24 (or to any electrical conductor) that is conveyed into a wellbore to a first formation zone to be perforated using a truck 20 and winch. A Surface Controller and associated power supply is typically located in a logging truck. The firing sequence begins on the bottom (Gun 1) and progresses upwardly to the top gun (Gun 3), completing the firing sequence. The system is initialized starting with Gun 3, followed by Gun 2 and Gun 1.

Initialization of the Switch Units (FIG. 14A) occurs by sending power and a sequence of signals to the gun string. In one embodiment, the first command signal is sent to the top gun, thereby validating its presence and position followed by turning its wireline (W/L) Switch to ON. The second gun (middle) is initialized in the same manner. Successive messages are sent to the first gun (bottom) and validated before turning on the ARM Switch and Fire Switch, respectively. Wireline 24 is prevented from shorting to ground because the W/L Switch of Switch Unit (1) remains OFF during firing. Shooting voltage is then applied to the wireline and the bottom gun is fired, destroying Switch Unit (1). The remaining Switch Units disconnect automatically from wireline 24 when power is turned off. Following relocation to a second perforating zone, the initialization sequence is repeated, except only two guns remain in the string. The bottom gun is now Gun 2. The signal is sent to the top gun, thereby validating its presence and position, followed by turning its W/L Switch to ON. Successive messages are sent to the second gun (bottom) and validated before turning on the ARM Switch and Fire Switch, respectively. Shooting voltage is then applied to wireline 24 and Gun 2 is fired. Following relocation to the third perforating zone, the initialization sequence is repeated except only one gun remains in the string. The bottom gun is now Gun 3. Successive messages are sent to the third gun (bottom) and validated before turning on the ARM Switch and Fire Switch, respectively. Shooting voltage is then applied to the wireline and the bottom Gun 3 is fired, completing the shooting sequence for a three-gun string. If the gun string has more or fewer guns, the same sequence of initializing and shooting follows the example presented here. If one of the guns fails to fire, the operator can communicate and control the remaining guns. Given that misfires are frequent, an extra gun(s) can be attached to the gun string and fired in place of a misfired gun, saving an additional trip in the hole. Accidental application of voltage on wireline 24 will not cause detonation because proper communication must be established before the Switch Unit will connect to the detonator. As an added safety element, a top switch may be added that is not connected to a detonator, giving a safety redundancy that prevents accidental detonation should a Switch Unit be defective.

FIG. 14A is a block diagram of a perforating Switch Unit showing the wireline input voltage to be positive with the wireline armor at ground potential. Power Supply 116 input connects the Switch Unit to the wireline and regulates the voltage for the power circuitry within the Switch Unit. State Machine 118 receives downlink messages, provides uplink states, traces command-sequence status and controls the W/L and Deto Switches 120, 122, and can be a specially programmed microprocessor or separate circuitry that is functionally equivalent to a microprocessor. Receiver 124 interfaces to the wireline to capture data from downlink signals. The Xmit transmitter 126 induces a signal current onto the wireline that is decoded at the surface. A Deto Switch 122, controlled by State Machine/microprocessor 118, provides switching between wireline power and detonator, and may be a single switch or two switches in series (for additional safety). During a perforating sequence, only the Deto Switch 122 in the bottom gun is selectively turned ON to apply power to the detonator. The W/L switch 120 controls both firing power and communication signals through the gun string. In one embodiment, W/L and Deto switches 120, 122 include transistors such as field effect transistors (FET) or integrated gate bipolar transistors (IGBT), but those skilled in the art who have the benefit of this disclosure will recognize that any type of switch that allows power to be connected by command to provide the advantage of disconnecting when powered down, thereby preventing the wireline from seeing a short during the next command sequence, may be utilized. As shown in FIG. 14A, a High Side Driver 128 is used to interface State Machine 118 to W/L Switch 120. Shooting power is shown as positive, which requires a High Side Driver to interface State Machine 118 to W/L Switch 120. If shooting power is negative, a High Side Driver would not be necessary provided the W/L Switch is in series with the W/L Armor input and the W/L In is powered with negative voltage.

A second embodiment of the perforating switch shown in FIG. 14A is shown in FIG. 14B, in which the signals transmitted from the Switch Units are permitted to have two different levels of uplink: current. The current level for uplink: Manchester communication is commanded from the surface computer to be either high 170 or low 172, depending upon whether the Surface Controller 30 (not shown in FIG. 14B) or the pre-check controller 48 (not shown in FIG. 14B) is commanding the Switch Units. This feature limits the communication current to a low value below that specified by API RP 67 whenever a communication check is done at the surface using an API RP 67 compatible Surface Tester with the Switch Units attached to detonators (see FIG. 3). In one embodiment, the current level of the first (low) transmitter is in the range of from about 4 milliamps to about 15 milliamps and the current level of the second (high) transmitter is in the range of from about 10 milliamps to about 100 milliamps and those skilled in the art will recognize that the current level of the first and second transmitters depends upon factors such as the number of Switch Units in the string. The limitation on current is not necessary, however, when the guns are deployed downhole on the cable (FIG. 13), which allows for higher current levels and consequently higher signal-to-noise. This feature of being able to select a higher uplink: current level allows for more robust communication over long cables, for example. Although described herein with reference to a perforating gun, those skilled in the art will recognize that the Switch Unit may be a Switch Unit for a release device or an explosive device for lowering into a wellbore as well as a perforating gun.

FIG. 14B shows another feature that improves reliability and safety of the Switch Units should the switch that connects the detonator to wireline 24 be shorted. If shorted, any power on the wireline would be applied directly to the detonator and can cause it to fire (or release if the Switch Unit is a Switch Unit on, for instance, a mechanical release device) off depth, for example. To prevent accidental firing (or release), a non-intrusive, low current level status check 174 is made of the switch to assure that it is OFF and not shorted before applying power.

Those skilled in the art will recognize that if the Switch Unit controls a detonator, the detonator can include all types, such as hot wire detonators, exploding foil initiators, exploding bridge wire detonators, and semiconductor bridge detonators. In addition, the Switch Units described herein can be integrated into the body of such detonators as shown in FIG. 15 for safer handling at the surface because application of accidental power will not cause the detonator to fire. Also, an integrated detonator needs only three wires compared to five wires for a separate Switch Unit connected to a detonator. Power can only be applied to the detonators after the proper communication sequence is established. The embodiment in FIG. 15 shows a Switch Unit that is integrated with a detonator having a negative shooting polarity (as compared to a positive shooting polarity shown in FIG. 14A). The integrated components include all parts of the Switch Unit along with whatever parts are required for the detonator of choice.

In an alternative embodiment, the interrogation-response communications system of the present invention does not use addressing between the surface computer and the downhole Switch Units. In this alternative embodiment, the surface computer and power supply are typically the same as used in ordinary perforating jobs, but different software is used for the communication protocol that tracks the number of uplink and downlink messages and the state machine position within each Switch Unit. FIGS. 16A and 16B are flow charts describing the program control sequence for initializing a three gun string and firing the bottom gun in accordance with this alternative embodiment of the present invention.

The process begins at the time the Surface Unit sends power down the wireline. The Surface Unit then sends a State (0) command to the top Switch Unit (3). After receiving the first message, the top Switch Unit (3) validates the message. Upon receiving a valid message, the State Machine advances within the top Switch Unit (3). If the message validation is error free, Switch Unit (3) uplinks a message containing switch status, State Machine status, and a security check word. If an invalid message is received, the Switch Unit uplinks an invalid response message. Upon receiving the first uplink message from Switch Unit (3), the surface computer validates the message, verifies the status of the State Machine, and switches and downlinks a W/L ON command. If the Switch Unit sends an error message or the uplink message was invalid in any way, the power to the gun string is removed and the process restarted. Upon receiving the second downlink message, the State Machine advances within the top Switch Unit (3). If the Message validation is error free, the Switch Unit (3) turns the W/L Switch ON, uplinks a message containing switch status, State Machine status, and a security check word and then goes into hibernation. The action of turning W/L Switch ON within Switch Unit (3) allows wireline power to be applied to Switch Unit (2). If an invalid message was receive, the Switch Unit uplinks an invalid message response with no other action. Upon receiving the second uplink message from Switch Unit (3), the surface computer validates the message and verifies the status of the State Machine and the switches, completing the communication to Switch Unit (3). Switch Unit (3) then goes into hibernation.

The following process begins a first time communication to Switch Unit (2). The surface computer sends the first message, a State (0) command to the middle Switch Unit (2).

Switch Unit (2) now receives and validates its first message. Upon receiving a valid message, the State Machine advances within the middle Switch Unit (2). If the message validation is error free, Switch Unit (2) uplinks a message containing switch status, State Machine status, and a security check word. If an invalid message is received, the Switch Unit uplinks an invalid response message. Upon receiving the first uplink message from Switch Unit (2), the surface computer validates the message, verifies the status of the State Machine and then switches and downlinks a W/L ON command. If the Switch Unit sends an error message or the uplink message was invalid in any way, the power to the gun string is removed and the process restarted. The middle Switch Unit (2) receives and validates the second downlink message. Upon receiving a valid message, the State Machine advances within middle Switch Unit (2). If the message validation is error free, the Switch Unit (2) turns the W/L Switch ON, uplinks a message containing switch status, State Machine status, and a security check word and then goes into hibernation. With the action of turning W/L Switch ON with Switch Unit (2), wireline power is applied to Switch Unit (1). If an invalid message is received, the Switch Unit uplinks an invalid message response. Upon receiving the second uplink message from Switch Unit (2), the surface computer validates the message, verifies the status of the State Machine and the switches, completing the communication to Switch Unit (2). Switch Unit (2) then goes into hibernation.

The following process begins a first time communication with Switch Unit (1). The Surface Unit sends the first message, a State (0) command to the bottom Switch Unit (1), which receives and validates its first message. Upon receiving a valid message, the State Machine advances within bottom Switch Unit (1). If the message validation is error free, Switch Unit (1) uplinks a message containing switch status, State Machine status, and a security check word. If an invalid message is received, Switch Unit (1) uplinks an invalid response message. Upon receiving the first uplink message from Switch Unit (1), the surface computer validates the message, verifies the status of the State Machine, and switches and downlinks an ARM ON command. If an error message was sent or the uplink message was invalid, power to the gun string is removed and the process restarted.

Upon receiving the second downlink message, the state machine advances within the bottom Switch Unit (1). If the message validation is error free, the Switch Unit (1) turns the ARM Switch ON, uplinks a message containing switch status, State Machine status, and a security check. If an invalid message is received, the Switch Unit uplinks an invalid message response. Upon receiving the second uplink message from Switch Unit (1), the surface computer validates the message, verifies status of the State Machine and the switches and downlinks a FIRE ON command. If an error message was sent or the uplink message was invalid in any way, power to the gun string is removed and the process restarted. Upon receiving the third downlink message, the state machine advances within the bottom Switch Unit (1). If the message validation is error free, the Switch Unit (1) turns the FIRE Switch ON, uplinks a message containing switch status, State Machine status, and a security check. If an invalid message is received, the Switch Unit uplinks an invalid message response. Upon receiving the third uplink message from Switch Unit (1), the surface computer validates the message, verifies the status of the State Machine and the switches. All conditions are now met to send power for detonation of the bottom gun. Following detonation, power is removed from the wireline and the gun string is repositioned for firing gun (2), which is now the bottom gun. On a gun string of (n) guns, the process is repeated for each gun. Again, no addressing is required.

Those skilled in the art will recognize that there are several variations on this method. One variation is for the top Switch Unit to send an automatic uplink message after being powered up containing a State (0) status, State Machine status, and a security check word. The surface computer records and validates the message and returns a downlink command to advance the State Machine to State (1), which turns the W/L Switch ON. The top Switch Unit then sends a second uplink message containing a State (1) status that is verified at the surface. Applying power to the next Switch Unit wakes it up and triggers an automatic uplink message of its current State (0) status. The uplink is delayed to allow the second uplink message to be received first at the surface. The second Switch Unit is then commanded from the surface to advance to State (1), and so forth until the bottom Switch Unit is located and power sent to detonate the bottom perforating gun. By recognizing the change in state of each Switch Unit as it is communicated, the surface computer uniquely identifies each Switch Unit in the perforating gun string.

FIG. 17 describes an embedded State Machine within each Switch Unit along with its pre-defined sequence of events. Upon power-up, the State Machine begins in State (0) and waits for the first downlink message. After receiving the first message, the State Machine advances from State (0) to State (1) and tests the message sent for correct bit count, content, and cyclic-redundancy-check (CRC). If the first message is invalid, the State Machine advances from State (1) to State (8) and uplinks an invalid message status, alerting the surface computer and causing the Switch Unit to progress to a permanent hold state waiting for power to be removed. If the first message is valid, the State Machine advances from State (1) to State (2) and uplinks a message containing valid message status and waits in State (2) for the second downlink message. After receiving the second downlink message, the State Machine advances from State (2) to State (3) and tests the second message sent for correct bit count, content, and cyclic-redundancy-check (CRC). If the second message is invalid, the State Machine advances from State (3) to State (9) and uplinks an invalid message status, alerting the surface computer and causing the Switch Unit to progress to a permanent hold state waiting for power to be removed. If the second message is verified, the received command bits must be decoded. The two legal commands for the second downlink message are a W/L ON command or an ARM ON command. If the Switch Unit decodes a W/L ON command, the State Machine advances from State (3) to State (4). While in State (4), the Switch Unit turns the W/L Switch ON, uplinks a valid status message and then goes into hibernation. The Switch Unit is not allowed to receive any further commands. If the Switch Unit decodes an ARM ON command, the State Machine advances from State (3) to State (5) and turns the ARM Switch ON, uplinks a valid status message and waits for a third downlink message. After receiving the third downlink message, the State Machine advances from State (5) to State (6) and again the message is validated for content. If an error is detected in the third downlink message, the State Machine advances from State (6) to State (10) and uplinks an invalid message status, alerting the surface computer and causing the Switch Unit to progress to a permanent hold state waiting for power to be removed. If a valid third downlink message is decoded along with a valid FIRE ON command, the State Machine advances from State (6) to State (7). While the State Machine is in State (7), the switch unit sets the FIRE Switch to ON, uplinks a valid status message, and waits for the firing voltage to be applied to the wireline. Application of the firing voltage causes the detonator to fire. Other error trapping as known to those skilled in the art may also be used in accordance with the method of the present invention. An alternative embodiment follows the same logic except that any uplink message also contains a unique address specific to a particular Switch Unit. The address is pre-programmed into the State Machine during manufacturing of the circuit, providing additional confirmation of the position of an individual Switch Unit within the tool string.

In the following paragraphs, an interrogation-response communication between the surface computer and the downhole Switch Units is described that uses common commands for all downlink interrogations. The surface computer and power supply are typically the same as used in ordinary perforating jobs and the communication protocol is implemented with appropriate software. All Switch Units respond to a common specific protocol for the downlink interrogation. A unique address is retrieved from each individual switch unit as a result of a downlink interrogation and is transmitted back up to the surface computer. In this embodiment, downlink commands do not contain the address of the switch, making the commands shorter and quicker than if they did.

FIG. 18 shows a flow chart describing a sequence of events for shooting two guns in a string. The first event occurs when the surface controller sends power down the wireline. The second event occurs when the surface computer interrogates the top switch using a common sequence. The first downlink transmission includes a State (0) command in order to sync the surface computer with the Switch Unit. The embedded state machine within each Switch Unit allows the surface computer to track the sequence of commands to all Switch Units in the entire string. After receiving the first message, the top Switch Unit validates the message. If the downlink message is free of errors, the top Switch Unit advances the State Machine, loads its embedded unique address, and uplinks a message containing switch status, state machine status, address information and a security check word. If the downlink message contains errors, the Switch Unit advances the state machine and uplinks an invalid message response identifying the detected error. This error trapping is repeated for any invalid receive message for a switch unit. For clarity, this routine will not be repeated in the remaining paragraphs of this description of the communication/control protocol of the present invention.

The surface computer receives and validates the first uplink message from the top Switch Unit. State Machine status is compared to expected results and the unique address is recorded. The surface computer then sends a second downlink containing a W/L ON command. If the Switch Unit sent an error message or the uplink message was invalid in any way, the power to the gun string is removed and the process restarted. The top Switch Unit receives and validates the second downlink message. If a valid message is received, the Switch Unit advances the State Machine, turns the W/L Switch ON, loads the embedded unique address for the top Switch Unit, and uplinks a message containing switch status, State Machine status, address information, and a security check word. The top Switch Unit then goes into hibernation. With the W/L switch turned ON, the second Switch Unit in the string is now powered. The surface computer verifies the [mal uplink message from the top Switch Unit, which includes State Machine and switch status and the unique address of the Switch Unit, completing the sequence for the top Switch Unit. The surface computer now interrogates the second Switch Unit, the first interrogation to the second Switch Unit including a State (0) command. After receiving the first message, the second Switch Unit validates the message. If the downlink message is free of errors, the second Switch Unit advances the State Machine, loads the embedded unique address, and uplinks a message containing switch status, state machine status, address information, and a security check word. If the downlink message contains errors, the Switch Unit advances the State Machine and uplinks an invalid message response identifying the detected error. The surface computer receives and validates the first uplink message from the second Switch Unit, compares State Machine status to expected results, and records the unique address. The surface computer sends a second downlink containing ARM ON command. If the Switch Unit sent an error message or the uplink message was invalid in any way, the power to the gun string is removed and the process restarted.

The second (bottom) Switch Unit receives and validates the second downlink message. If a valid message is received, the Switch Unit advances the State Machine, turns the AM Switch ON, loads the embedded unique address for the second Switch Unit, and uplinks a message containing switch status, state machine location, address information and a security check word. The surface computer receives and validates the second uplink message from the second (bottom) Switch Unit. State Machine status and unique address are compared to expected results and the surface computer sends a third downlink message containing a FIRE ON command. If the Switch Unit sent an error message or the uplink message was invalid in any way, the power to the gun string is removed and the process restarted. The second (bottom) Switch Unit receives and validates the third downlink message. If a valid message is received, the Switch Unit advances the State Machine, turns the FIRE Switch ON, loads the embedded unique address for the second Switch Unit, and uplinks a message containing switch status, state machine location, address information, and a security check word. The surface computer receives and validates the third uplink message from the second (bottom) Switch Unit. State Machine status and unique address are compared to expected results, and if all status and address data is correct, the surface power supply is allowed to send shooting voltage to the second switch and the bottom gun detonates.

Those skilled in the art will recognize that there are several variations on this sequence. One variation is for the top Switch Unit to send an automatic uplink message containing a State (0) status, State Machine status, the unique embedded address for the top Switch Unit, and a security check word after being powered up. The surface computer records and validates the message and returns a downlink command to advance the State Machine to State (1), which turns the W/L Switch ON, which powers the next Switch Unit, which then automatically uplinks a message containing a State (0) status, State Machine status, the unique embedded address, and a security check word, and so on until the bottom Switch Unit is reached and firing power applied to detonate the gun.

In the preceding paragraphs, selective perforating with Switch Units controlling power access to detonators was described. FIG. 19A shows a top level system having a combination of parallel and serial control units for perforating. The difference is that serial control units are electrically connected in any command sequence that accesses a particular unit below them. Parallel units need not be connected to access units below them. The parallel units are shown on top of the string in FIG. 19A although they could be located anywhere in the string, e.g. between series control units, below the series units or any general placement. One parallel Control Unit is used in conjunction with a Release Device. Another parallel Control Unit is used for monitoring a plurality of sensors. These sensors include, but are not limited to, such functions as acceleration, downhole voltage, downhole current, inclination and rotational positioning, temperature, and pressure. Included in the serial string is a single control unit for detonating a perforating gun. The actual number of serial control units for perforating guns can be one or more. Another service uses a serial control unit for igniting a Setting Tool.

Another version of the application of parallel/series communication is for conveyance of well logging tools by a tractor as shown in FIG. 19B. A Control Unit located at the tractor allows electrical power to be selected by command to either power the tractor or the logging tools. One or more auxiliary tractor tools (millers, cleaners, strokers, for instance), each with their own Control Unit and identified generically as "select ID1," "select ID2," etc. at reference numeral 130A, 130B, etc. can be selected and powered individually. The Control Units for the tractor and the auxiliary tractor tools are connected electrically in parallel Those skilled in the art who have the benefit of this disclosure will recognize that a particular auxiliary tractor tool 130A, 130B, etc. may have two or more Control Units connected in series. FIG. 19B also shows two or more logging tools 132A, 132B connected electrically in parallel that can be individually powered by either positive or negative DC voltage from the surface, as detailed in FIG. 19C. One or more safety subs are located below the tractor to prevent accidental tractor power from reaching logging tools 132A, 132B. Each safety sub contains its own Control Unit that allows electrical connection upon command from the surface.

FIG. 20 shows a method for communicating with microprocessor/state machines that have both parallel and serial Control Units on the wireline as shown in FIGS. 19A and 19B. In the method illustrated, each state machine or device has a plurality of its own set of legal commands. Upon receiving a message, the receiving controller decodes the embedded command. Only if the command is legal is the receiving controller allowed to generate an uplink message preventing buss contention or collision of data whenever two or more remote units are on a buss or party line connection. In addition, before an uplink transmission can occur, the logical position of the state machine is compared and must be in sync with the expected state position transmitted by the host. This comparison further discriminates which messages are legal and which controllers are allowed to return an uplink message. In another embodiment, an identifier, either unique or common to that type of tool, is attached to each uplink or returned message to distinguish one type of tool from another. Those skilled in the art will recognize that these methods apply to each of the controllers within the parallel and serial systems shown in FIGS. 19A and 19B.

Referring to FIG. 20, the Surface Unit first applies power to the wireline, causing all control units on the communication buss to initiate a power-up reset and enter state "0" waiting for a downlink message. The Surface Unit then sends a downlink message containing a plurality of commands specific to only one controller along with a state "0" status. Every downhole controller then receives and verifies the message for errors. If an error is detected, the downhole controller goes back to state "0" with no further action. If the message is error free, the state machine advances and the command bits within the message are decoded. If the command is illegal, the downhole device reverts to state "0." If the command is legal for a particular device the state machine again advances, uplinks a message, and waits for a second response.

The Surface Unit then receives and validates the first uplink message. If the message is in error, the Surface Controller goes into a restart mode by turning power OFF and then back ON for a fresh start. If the message is error free, the Surface Controller transmits a second message containing the same control command along with the state machine expected position. Again, all remote control units receive the second message and only the one controller matching the downlink state position and having received a legal command is allowed to advance and process the message. If the message is verified and an error exists, then a bad message status is returned and the downhole device must be powered down to continue. If the message is verified to free of errors, the command is processed and a return (uplink) confirmation message is transmitted. The Surface Controller receives and validates the message, and if the message contains errors, the Surface Controller restarts the entire process. If the message is error free, the Surface Controller accepts the data and continues to the next command or next control unit.

FIG. 21 illustrates a predefined sequence of events for each control unit on the buss connected in either parallel or serial and containing one or more microprocessors or state machines as referred to in FIGS. 19A, 19B and 20. Upon power-up, the state machine enters state "0" and waits for a downlink message. Upon receiving a message from the surface, the state machine advances to state "1". While in state "1," the message is validated for proper state position, cyclic-redundancy-check, and message length. If an invalid message is decoded by the microprocessor, the state machine reverts to state "0." If a valid message is decoded, the state machine advances to state "2." While in state "2," the command bits are decoded. If an illegal command is decoded for that particular controller, the state machine again goes back to state "0." If a legal command is decoded, the device returns a message containing state "3," the decoded command, all status, embedded address (if used) and cyclic-redundancy-check. The device now waits for a second downlink message. Upon receiving a second downlink message the state machine advances to state "4." While in state "4," the control unit verifies receiving the proper state position from the surface controller, again compares the command bits with the previous command bits, cyclic-redundancy-check, and message length. If the message is invalid in any way, the state machine advances to state "6" and the downhole controller transmits an uplink message confirming an invalid message. At this point, the control unit must be powered down to restart. If the message is valid, the state machine advances to state "5." While in state "5," the control unit processes the command. For the last event, the control unit transmits an uplink message including state "5" position, all status, embedded address (if used), and cyclic-redundancy-check. The State Diagram in FIG. 21 shows the microprocessor/state machine entering a sleep mode following a command and will not listen to any more messages until a complete restart as would be the case for a serial connected control unit, but a parallel connected control unit may wait for additional commands and mayor may not enter the sleep mode.

Those skilled in the art who have the benefit of this disclosure will recognize that changes can be made to the component parts and steps of the present invention without changing the manner in which those parts/steps function and/or interact to achieve their intended result. Several examples of such changes have been described herein, and those skilled in the art will recognize other such changes from this disclosure. All such changes are intended to fall within the scope of the following, non-limiting claims.

What is claimed is:

1. A method of communicating with a switch unit located on a perforating gun, release device, or explosive device for lowering into a wellbore comprising the steps of:
   - sending a command to the switch unit;
   - identifying the status of a switch with a state machine within the switch unit;
   - identifying one or more valid commands for the status of the switch with the state machine;
   - determining whether the command is valid for the status of the switch with the state machine;
   - if the command is invalid, returning a signal comprising an error message from the switch unit at a current level in the range of from about 4 milliamps to about 15 milliamps;
   - if the command is valid, controlling the position of the switch; and
   - if the command is valid, returning a signal validating switch status from the switch unit at a current level in the range of from about 4 milliamps to about 15 milliamps.

2. The method of claim 1 wherein the return signal further comprises the status of the switch.

3. The method of claim 1 wherein the return signal further comprises an identifier for the switch unit.

4. The method of claim 1 additionally comprising the step of lowering the perforating gun, release device, or explosive device into the wellbore and returning a signal from the switch unit at a current level in the range of from about 10 milliamperes to about 100 milliamperes.

5. A method of switching between a safe mode for tractoring and a perforating mode for perforating in a tool string including a tractor and a perforating gun for lowering into a wellbore on a wireline comprising the steps of:
   - sending a signal to a control unit on the tractor from the surface;
   - identifying the status of a switch with a state machine within the switch unit;
   - identifying one or more valid commands for the status of the switch with the state machine;
   - determining whether the command is valid for the status of the switch with the state machine;
   - if the command is invalid, returning a signal comprising an error message from the control unit;
   - if the command is valid, controlling the position of the switch to connect the wireline to either the tractor motor or a through wire connecting to the perforating gun while blocking negative voltage below a predetermined threshold through the wireline; and
   - if the command is valid, returning a signal validating switch status to the surface.

6. The method of claim 5 wherein the tool string additionally includes a safety sub between the tractor and the perforating gun and negative voltage is blocked at the output of the safety sub.

7. The method of claim 5 wherein the return signal comprises an identifier for the control unit.

8. The method of claim 5 wherein the return signal comprises the status of the switch.

* * * * *